United States Patent
Kim

(10) Patent No.: US 9,514,260 B2
(45) Date of Patent: Dec. 6, 2016

(54) LAYOUT DESIGN SYSTEM PROVIDING EXTENDED ACTIVE AREA IN FILLER DESIGN AND SEMICONDUCTOR DEVICE FABRICATED USING THE SYSTEM

(71) Applicant: Jin-Tae Kim, Daejeon (KR)

(72) Inventor: Jin-Tae Kim, Daejeon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/474,512

(22) Filed: Sep. 2, 2014

(65) Prior Publication Data

US 2015/0161314 A1    Jun. 11, 2015

(30) Foreign Application Priority Data

Dec. 5, 2013   (KR) .......................... 10-2013-0150758

(51) Int. Cl.
*G06F 17/50*       (2006.01)

(52) U.S. Cl.
CPC ....... *G06F 17/5072* (2013.01); *G06F 17/5068* (2013.01)

(58) Field of Classification Search
None
See application file for complete search history.

(56) References Cited

U.S. PATENT DOCUMENTS

| | | |
|---|---|---|
| 7,103,870 B2 | 9/2006 | Misaka et al. |
| 7,484,198 B2 | 1/2009 | Lin et al. |
| 7,961,010 B2 | 6/2011 | Kim et al. |
| 7,979,829 B2 | 7/2011 | Smayling |
| 8,063,402 B2 | 11/2011 | Sokel et al. |
| 8,504,972 B2 | 8/2013 | Hou et al. |
| 8,510,700 B2 | 8/2013 | Cocchi et al. |
| 2007/0111405 A1* | 5/2007 | Watanabe ........... H01L 27/0207 438/142 |
| 2010/0270600 A1* | 10/2010 | Inukai ................. G06F 17/5031 257/288 |

* cited by examiner

*Primary Examiner* — Leigh Garbowski
(74) *Attorney, Agent, or Firm* — Volentine & Whitt, PLLC

(57) ABSTRACT

A layout design system includes a storage unit storing first and second standard cell designs, and a displacement module that arranges the first and second standard cell designs to generate an intermediate design in accordance with the chip design requirement. A first area for the first standard cell design and a second area for the second standard cell design are separated in the intermediate design by a filler design having no active area. Extended active areas are formed in the filler design in relation to the first standard cell design and second standard cell design.

19 Claims, 27 Drawing Sheets

1200

1300

1400

LAYOUT DESIGN SYSTEM PROVIDING EXTENDED ACTIVE AREA IN FILLER DESIGN AND SEMICONDUCTOR DEVICE FABRICATED USING THE SYSTEM

CROSS-REFERENCE TO RELATED APPLICATIONS

This application claims priority from Korean Patent Application No. 10-2013-0150758 filed on Dec. 5, 2013, the subject matter of which is hereby incorporated by reference.

BACKGROUND

The inventive concept relates generally to layout design systems and semiconductor devices fabricated using the layout design systems.

For many decades now, the ongoing development of semiconductor devices is a process characterized by continuous reductions in the size of the devices as well as reductions in the size and spacing of constituent components. The design and fabrication of semiconductor devices are extremely complex processes and many tools have been developed over the years to assist design/fabrication engineers and technicians.

One of many critical tasks associated with the design and fabrication of semiconductor devices is the preparation of one or more layout design(s). As contemporary semiconductor devices continue to decrease in size and as constituent component density continues to rise, the quality of layout designs becomes increasingly important.

SUMMARY

Certain embodiments of the inventive concept provide layout design systems capable of generating layout designs that ensure greater reliability of semiconductor devices. Other embodiments of the inventive concept provide various semiconductor devices that are designed and fabricated using layout design systems generating improved layout designs.

Additional advantages and features of the inventive concept will be set forth in the following written description taken in conjunction with the accompanying drawings.

In one aspect the inventive concept provides a layout design system that receives a chip design requirement and provides a corresponding chip design to a circuit capable of storing the chip design. The layout design system includes; a processor, a storage unit that stores a first standard cell design defining a first active area having a first width and a second standard cell design defining a second active area having a second width different from the first width, and a displacement module operating in conjunction with the processor and configured to arrange the first standard cell design in a first area and the second standard cell in a second area to generate an intermediate design in accordance with the chip design requirement, wherein the first area and the second area are separated in the intermediate design by a filler design having no active area, and the displacement module is further configured to store the intermediate design in the storage unit.

In another aspect the inventive concept provides a layout design system that receives a chip design requirement and provides a corresponding chip design to a circuit capable of storing the chip design. The layout design system includes; a processor, a storage unit that stores a first standard cell design defining a first active area having a first width and a second standard cell design defining a second active area having a second width different from the first width, a displacement module operating in conjunction with the processor and configured to arrange the first standard cell design in a first area and the second standard cell in a second area to generate an intermediate design in accordance with the chip design requirement, wherein the first area and the second area are separated in the intermediate design by a filler design having no active area.

In another aspect the inventive concept provides a semiconductor device including; a first area including a first active base separated by a first Deep Trench Isolation (DTI) and extending in a first direction, a first normal gate formed on the first active base and extending in a second direction crossing the first direction, a second area including a second active base separated by a second DTI and extending in the first direction, a second normal gate formed on the second active base and extending in the second direction, a third area including a third active base arranged between the first and second areas, separated by the first DTI and the second DTI, and extending in the first direction, and a dummy gate formed on the third active base and extending in the second direction, wherein widths of the third active base in the first direction are different from each other in the third area.

BRIEF DESCRIPTION OF THE DRAWINGS

The above and other objects, features and advantages of the inventive concept will be apparent to those skilled in the art upon consideration of the following detailed description taken in conjunction with the accompanying drawings, in which.

DETAILED DESCRIPTION

Figure 1:
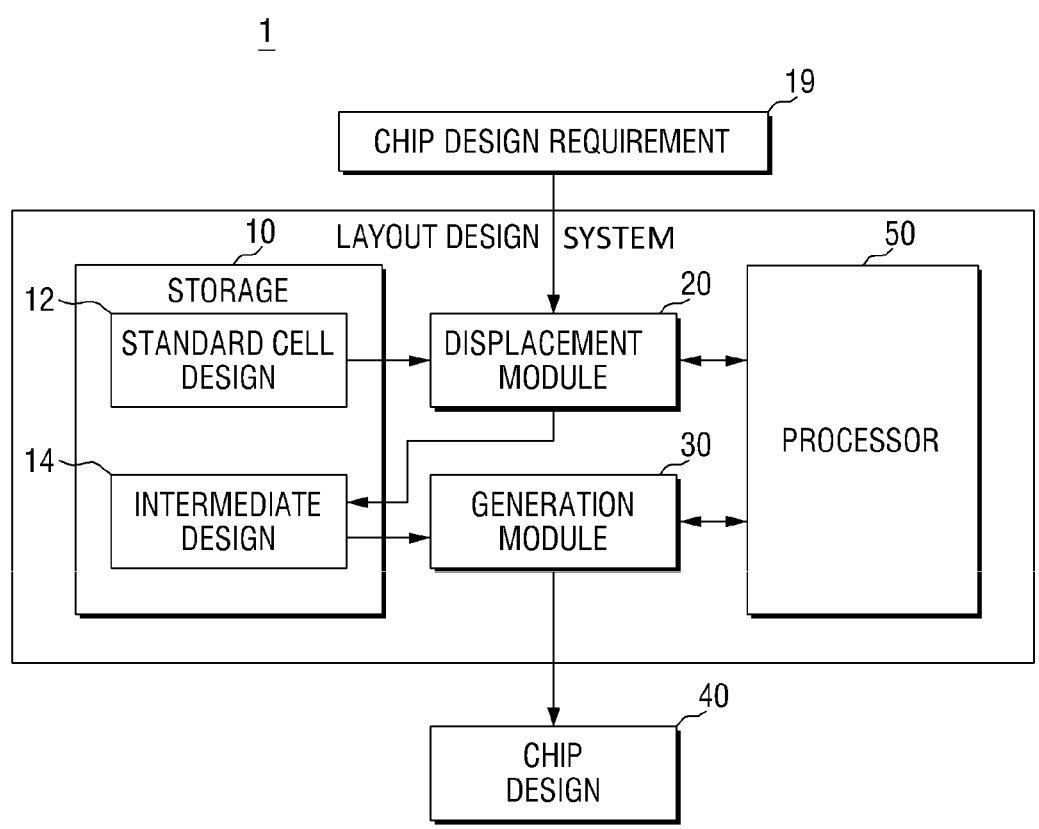
FIG. 1 is a block diagram of a layout design system according to an embodiment of the inventive concept.

Advantages and features of the inventive concept and methods of accomplishing the same will be better understood upon consideration of the following detailed description of embodiments along with the accompanying drawings. The inventive concept may, however, be embodied in many different forms and should not be construed as being limited to only the illustrated embodiments. Rather, these embodiments are provided so that this disclosure will be thorough and complete and will fully convey the concept of the inventive concept to those skilled in the art. The scope of the inventive concept is defined by the appended claims. In the drawings, certain layer thickness(es) and relative layer thickness(es) have been exaggerated for clarity. Throughout the written description and drawings like reference numbers and labels are used to denote like or similar elements.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. As used herein, the term "and/or" includes any and all combinations of one or more of the associated listed items.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the inventive concept (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the inventive concept.

The inventive concept will be described with reference to perspective views, cross-sectional views, and/or plan views, in which preferred embodiments of the inventive concept are shown. Thus, the profile of an exemplary view may be modified according to manufacturing techniques and/or allowances. That is, the embodiments of the inventive concept are not intended to limit the scope of the inventive concept but cover all changes and modifications that can be caused due to a change in manufacturing process. Thus, regions shown in the drawings are illustrated in schematic form and the shapes of the regions are presented simply by way of illustration and not as a limitation.

Unless defined otherwise, all technical and scientific terms used herein have the same meaning as commonly understood by one of ordinary skill in the art to which this inventive concept belongs. It is noted that the use of any and all examples, or exemplary terms provided herein is intended merely to better illuminate the inventive concept and is not a limitation on the scope of the inventive concept unless otherwise specified. Further, unless defined otherwise, all terms defined in generally used dictionaries may not be overly interpreted.

FIG. 1 is a block diagram illustrating a layout design system according to an embodiment of the inventive concept.

The respective terms "unit" and "module" as used herein denote software, firmware and/or hardware component(s) (e.g., gate arrays, floating-point gate arrays (FPGA) and/or application specific integrated circuit (ASIC), etc.) capable of performing the described functions and tasks, along with related functions and tasks, as will be appreciated by those skilled in the art. A unit and/or module may, wholly or in part, be configured or stored in an addressable storage medium, and may be further configured to executed by one or more logical, computational and/or processing circuit(s). Accordingly, certain unit(s) and/or module(s) may include, by way of example, software components, object-oriented software components, class components and task components, processes, functions, attributes, procedures, subroutines, segments of program code, drivers, firmware, microcode, circuitry, data, databases, data structures, tables, arrays, and variables. The functionality provided by such units and/or modules may be combined into fewer units and/or modules, or further separated into additional units and/or modules.

Referring to FIG. 1, a layout design system 1 generally comprises a storage unit 10, a displacement module 20, a generation module 30, and a processor 50.

Certain standard cell design 12 may be stored in the storage unit 10. Those skilled in the art will be generally familiar with the use and provision of standard cell designs during the development of a layout design for a semiconductor device. For example, a "standard cell" may be defined as a unit that forms the minimum unit in a block, a device, or a chip design. For example, if the semiconductor device being designed is a Static Random Access Memory (SRAM) or similar logic device, a standard cell used during the design might be an inverter cell. In this context, the standard cell design 12 of FIG. 1 is assumed to be a layout portion capable of fabricating at least a standard cell. As described in some additional detail hereafter, certain examples of the standard cell design 12 that may be stored and used in embodiments of the inventive concept will include an active area and a normal gate area arranged on the active area.

Although FIG. 1 assumes a single standard cell design 12 being stored in the storage unit 10, other embodiments of the inventive concept will store (and use) multiple standard cell designs. That is, in some embodiments of the inventive concept, a plurality of standard cell designs 12 respectively associated with a block, multiple blocks, a constituent device, and/or a complete semiconductor "chip" may be stored in the storage unit 10. A collection of standard cell designs 12 may be referred to as a "library" of standard cell designs.

The storage unit 10 may also be used to store an intermediate design 14 received from the displacement module 20. The intermediate design 14 may include, for example, one or more standard cell design(s) 12 as well as a filler design. In this context, a filler design may be arranged adjacent to the standard design 12 and be designated such that no active area is arranged therein. The use of one or more filler design(s) will be described in more detail later.

As suggested by FIG. 1, the standard cell design 12 may be used as an input to the displacement module 12, and the intermediate design 14 may be used as an input of the generation module 30.

In certain embodiments, the storage unit 10 may be implemented, wholly or in part, using one or more nonvolatile memory device(s), such as a NAND-type flash memory, a NOR-type flash memory, a magnetic random access memory (MRAM), a phase-change RAM (PRAM), a resistance RAM (RRAM), etc. In other embodiments, the storage unit 10 may include a hard disk drive or similar magnetic storage device.

The displacement module 20 may be used to generate the intermediate design 14 through arrangement of one or more of the plurality of standard cell designs 12 in accordance with a defined chip design requirement 19. Here, the chip design requirement 19 may be provided to the displacement module 20 as a user input or as a pre-stored data file in the storage unit 10.

The generation module 30 may be used to generate design elements in the intermediate design 14 using, for example, the processor 50. In such embodiments, the design elements generated by the generation module 30 may include (e.g.,) an active area and a dummy gate area. More specifically, in certain embodiments of the inventive concept, the generation module 30 may be used to generate one or more active area(s) in one or more filler design(s) in consideration of (e.g.,) the width of the active area associated with one or the standard cell designs 12 relevant to the intermediate design 14.

In certain embodiments of the inventive concept, the displacement module 20 and the generation module 30 may be variously implemented in software that is capable of being executed by processor 50. If both the displacement module 20 and generation module 30 are implemented in software, these modules may be stored in the storage unit 10 in code form, or may be stored in code form in another storage unit (not shown) separate from the storage unit 10.

Thus, in the working example of FIG. 1, the processor 50 may be used to execute the code implementing the displacement module 20 and/or generation module 30 in order to provide the necessary functionality and operations described hereafter. Although FIG. 1 illustrates only a single processor 50, other embodiments of the inventive concept will include two or more separate processing units (e.g., a multi-core processor). If a layout design system according to an embodiment of the inventive concept operates in a multi-core environment, the overall execution efficiency may be improved. Although not shown in FIG. 1, those skilled in the art will understand that the processor 50 may include cache memories L1 and L2 to improve execution efficiency.

Thus, the layout design system 1 described in relation to FIG. 1 is capable of generating a chip design 40 through arrangement of one or more standard cell designs 12 in accordance with the chip design requirement 19. The scale of layouts provided by a layout design system consistent with embodiments of the inventive concept may be varied according to need. For example, certain embodiments of the inventive concept may provide layout design systems capable of generating a block design, or multi-block design through arrangement of one or more standard cell designs as directed by a block design requirement.

Figure 2:
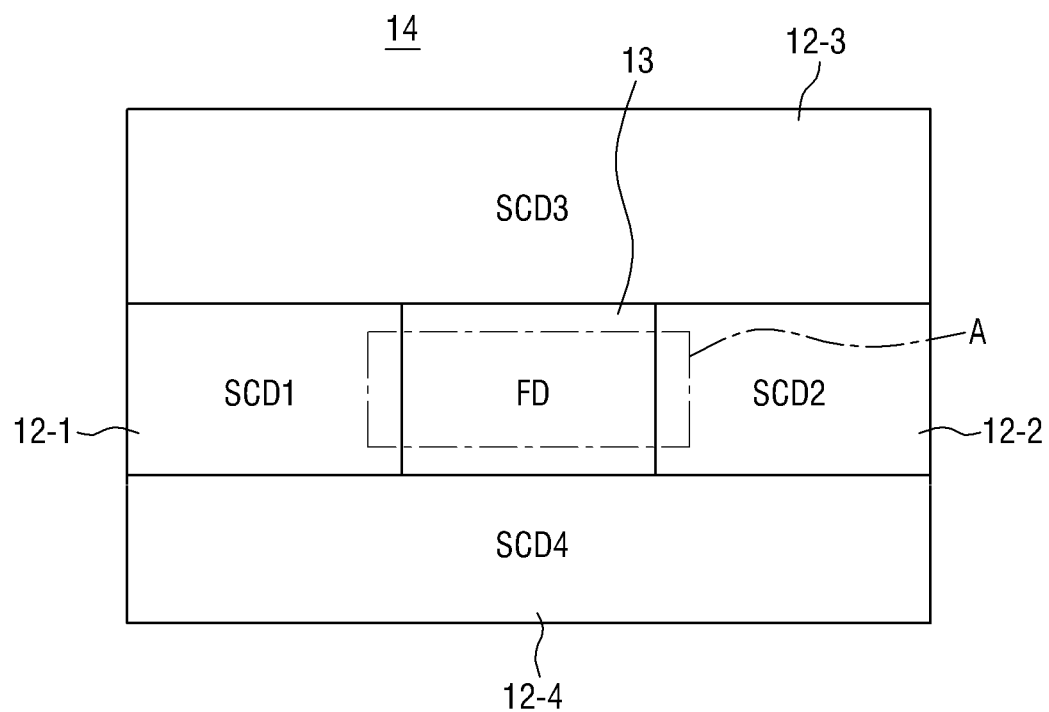
FIG. 2 is a layout diagram further illustrating the use of the intermediate design 14 of FIG. 1.
Figure 3:
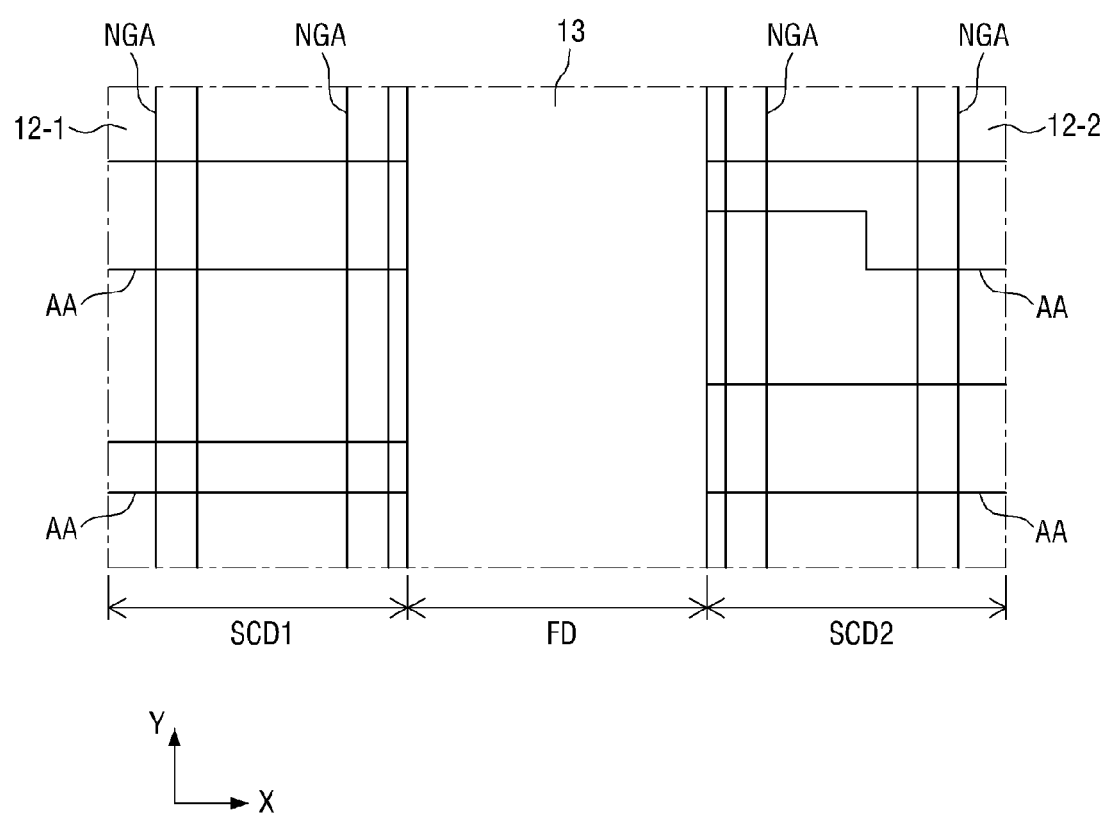
FIG. 3 is a layout diagram showing in some additional detail the area A of FIG. 2.
Figure 4:
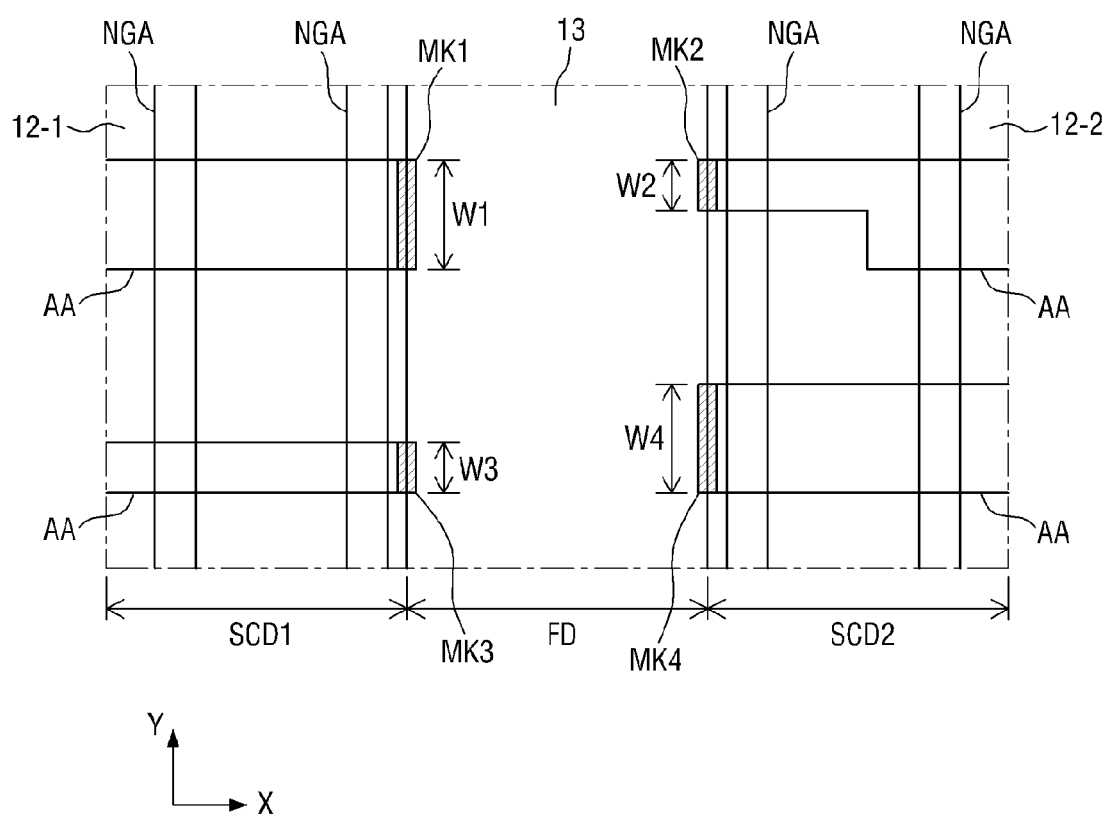
FIGS. 4 and 5 are respective layout diagrams further illustrating the use of the displacement module 20 of FIG. 1.
Figure 5:
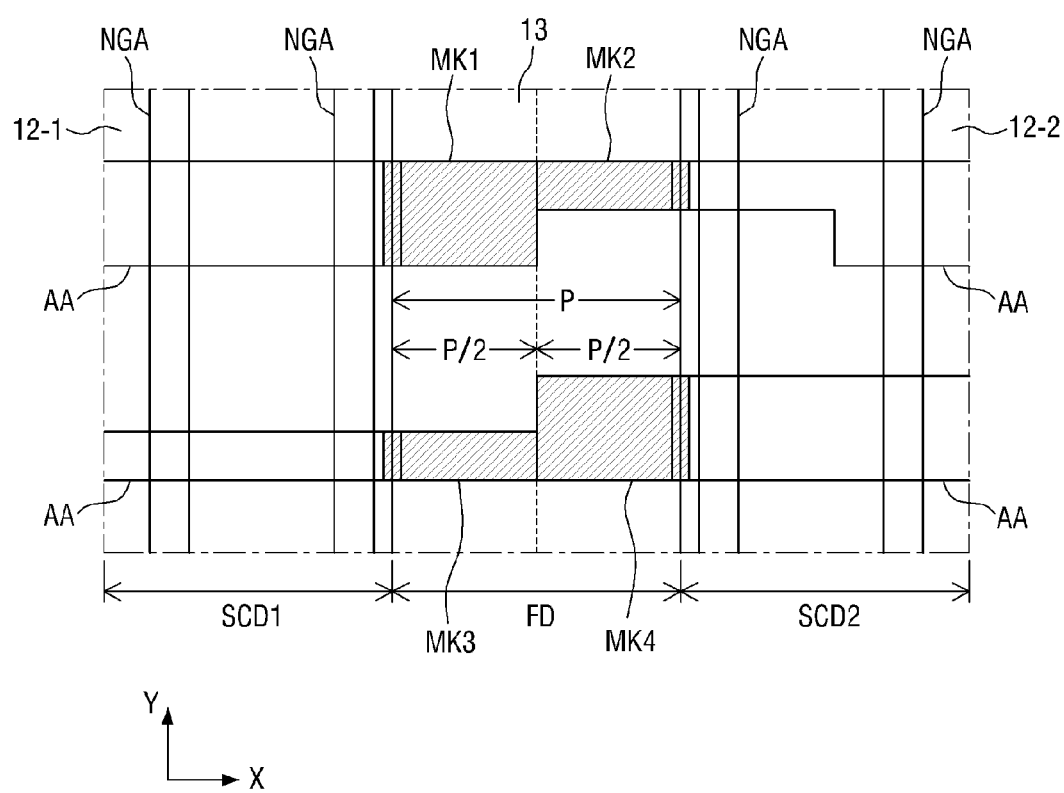
Figure 6:
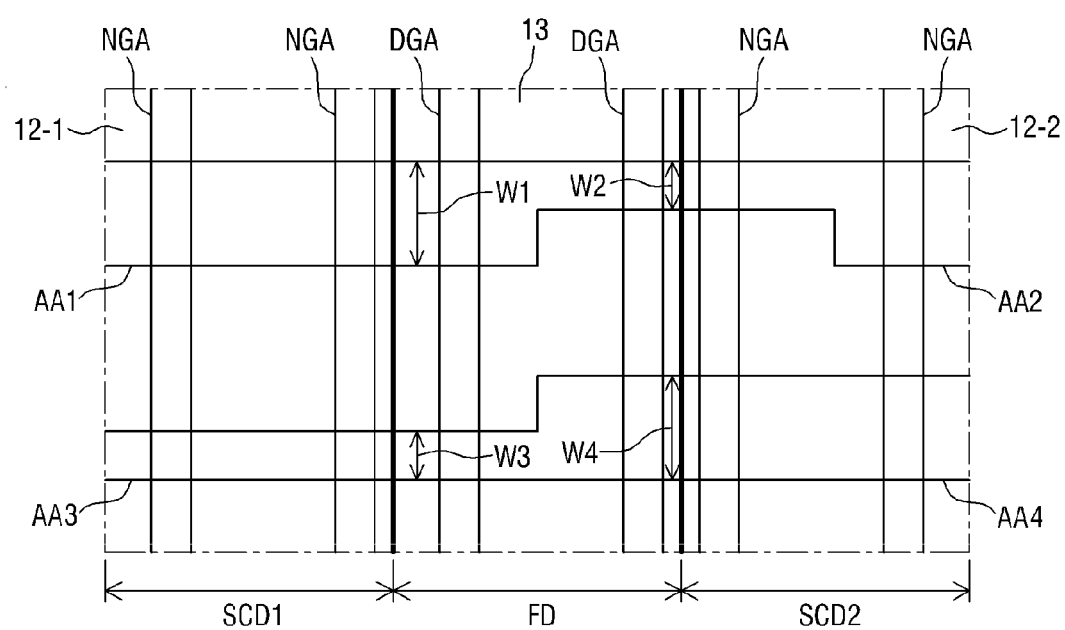
FIG. 6 is a layout diagram further illustrating use of the generation module 30 of FIG. 1.

FIG. 2 is one layout diagram as an example of a possible intermediate design 14 stored in the storage unit 10 of FIG. 1. FIG. 3 is a more detailed illustration of area A shown in FIG. 2. FIGS. 4 and 5 are respective layout diagram further illustrating the operation of the displacement module 20 of FIG. 1, and FIG. 6 is a layout diagram further illustrating operation of the generation module 30 of FIG. 1.

As noted above in relation to FIG. 1, the displacement module 20 may arrange a plurality of standard cell designs 12 according to a received chip design requirement 19, and generate a corresponding intermediate design 14 by (e.g.,) arrangement of one or more filler design(s) and the plurality of standard cell designs. FIG. 2 illustrates an example of an arrangement of a plurality of standard cell design 12 and a filler design 13 in accordance with the chip design requirement 19.

Referring to FIG. 2, a third standard cell design 12-3 and a fourth standard cell design 12-4 are arranged at upper and lower portions of the intermediate design 14. Further, a first standard cell design 12-1 and a second standard cell design 12-2 are arranged between the third standard cell design 12-3 and fourth standard cell design 12-4, wherein the first standard cell design 12-1 and second standard cell design 12-2 are spaced apart one from the other by a "layout gap".

Hence, the filler design 13 may be arranged in the layout gap between the first standard cell design 12-1 and second standard cell design 12-2. The displacement module 20 may be used to arrange the filler design 13 provided an active area is disposed in the layout gap between the first standard cell design 12-1 and second standard cell design 12-2. This approach will be described in more detail with reference to FIG. 3.

Referring to FIG. 3, the first standard cell design 12-1 is assumed to include an active area AA extending in a first direction X, and to further include a normal gate area NGA extending in a second direction Y. The second standard cell design 12-2 is also assumed to include an active area AA extending in the first direction X, and a normal gate area NGA extending in the second direction Y.

Thus, in the illustrated example of FIG. 3, no active area AA is arranged within the filler design 13, as arranged by the displacement module 20. Where no active area AA is disposed in a defined filler design 13, the displacement module 20 may simply provide the resulting intermediate design 14 to the storage unit 10. Thereafter, the generation module 30 may generate the chip design 40 from the intermediate design 14 stored in the storage unit 10.

However, in certain embodiments of the inventive concept, the displacement module 20 may additionally generate certain "layout markers" associated with the filler design 13 and provide the intermediate design 14 including these layout markers. FIGS. 4 and 5 illustrate this approach.

Referring first to FIG. 4, the displacement module 20 may be used to generate first, second, third and fourth markers (MK1 through MK4), each respectively indicating a corresponding width (W1, W2, W3 and W4) for an active areas AA that is arranged adjacent to the filler design 13.

Specifically, the displacement module 20 may be used to generate the first marker MK1 having the first width W1 on the boundary of the filler design 13 adjacent to the first standard cell design 12-1, and to generate the third marker MK3 having the third width W3 on the boundary of the filler design 13 adjacent to the first standard cell design 12-1. Further, the displacement module 20 may be used to generate the second marker MK2 having the second width W2 on the boundary of the filler design 13 adjacent to the second standard cell design 12-2, and to generate the fourth marker MK4 having the fourth width W4 on the boundary of the filler design 13 adjacent to the second standard cell design 12-2.

Referring to FIG. 5, the displacement module 20 may further be used to measure a pitch P between the first standard cell design 12-1 and the second standard cell design 12-2, and may extend the first through fourth markers MK1 to MK 4 up to a point that corresponds to ½ of the measured pitch P. Accordingly, the length of the first through fourth markers MK1 to MK4 may be ½ of the measured pitch P.

Although FIG. 5 shows an example wherein the displacement module 20 extends the length of the first to fourth markers MK1 to MK4 up to ½ of the measured pitch P, the scope of the inventive concept is not limited thereto. The length of the first to fourth markers MK1 to MK4 may be differently modified according to design. For example, in certain embodiments of the inventive concept, the arrangement module 20 may extend the length of the first and third markers MK1 and MK3 up to ¼ of the measured pitch P and may extend the length of the second and fourth markers MK2 and MK4 up to ¾ of the measured pitch P.

Thereafter, the displacement module 20 may provide an intermediate design 14 including the layout markers illustrated in FIG. 5, and the generation module 30 may then generate a chip design using the intermediate design 14. For example, the generation module 30—once provided with the intermediate design 14—may generate the chip design 40 including one or more active area(s) and/or dummy gate area(s).

Referring now to FIG. 6, the generation module 30 may be used to generate one or more "extended" active area(s) AA that extend between "original" active areas AA defined by (e.g.,) the first and second standard cell designs 12-1 and 12-2. Note that the extended active area(s) extend across portions of the filler design 13 in a manner consistent with the respective widths of the original active areas AA defined by the first and second standard cell designs 12-1 and 12-2 as they run adjacent to the filler design 13, and as indicated by the first through fourth markers (MK1 to MK4) illustrated in FIG. 5. In this manner, the generation module 30 may be used to generate an extended active area AA at least partially disposed in the filler design 13 using established layout markers.

Thus, with specific reference to FIGS. 5 and 6, the generation module 30 may be used to generate (1) a first extended active area AA1 that extends from the first standard cell design 12-1 having the first width W1 as indicated by the first marker MK1 into the filler design 13; (2) a second extended active area AA2 that extends from the second standard cell design 12-2 towards the first extended active area AA1 and having a second width W2 as indicated by the second marker MK2 into the filler design 13; (3) a third extended active area AA3 that extends from the first standard cell design 12-1 having the third width W3 as indicated by the third marker MK3 into the filler design 13; and (4) a fourth extended active area AA4 that extends from the second standard cell design 12-2 towards the third extended active area AA3 and having the fourth width W4 as indicated by the fourth marker MK4 into the filler design 13.

As illustrated in FIG. 6, the particular length of an extended active area into the filler design 13 may be changed in accordance with a corresponding pitch definition. For example, a point defined by ½ the pitch P separating the first standard cell design 12-1 and the second standard cell design 12-2 may be used to commonly defined the respective lengths for the first, second, third and fourth extended active areas AA1, AA2, AA3 and AA4.

Following generation of the extended active areas, the generation module 30 may be used to generate one or more dummy gate area(s) DGA that extend in the second direction Y across portion(s) of one or more of the extended active areas disposed in the filler design 13.

Figure 7:
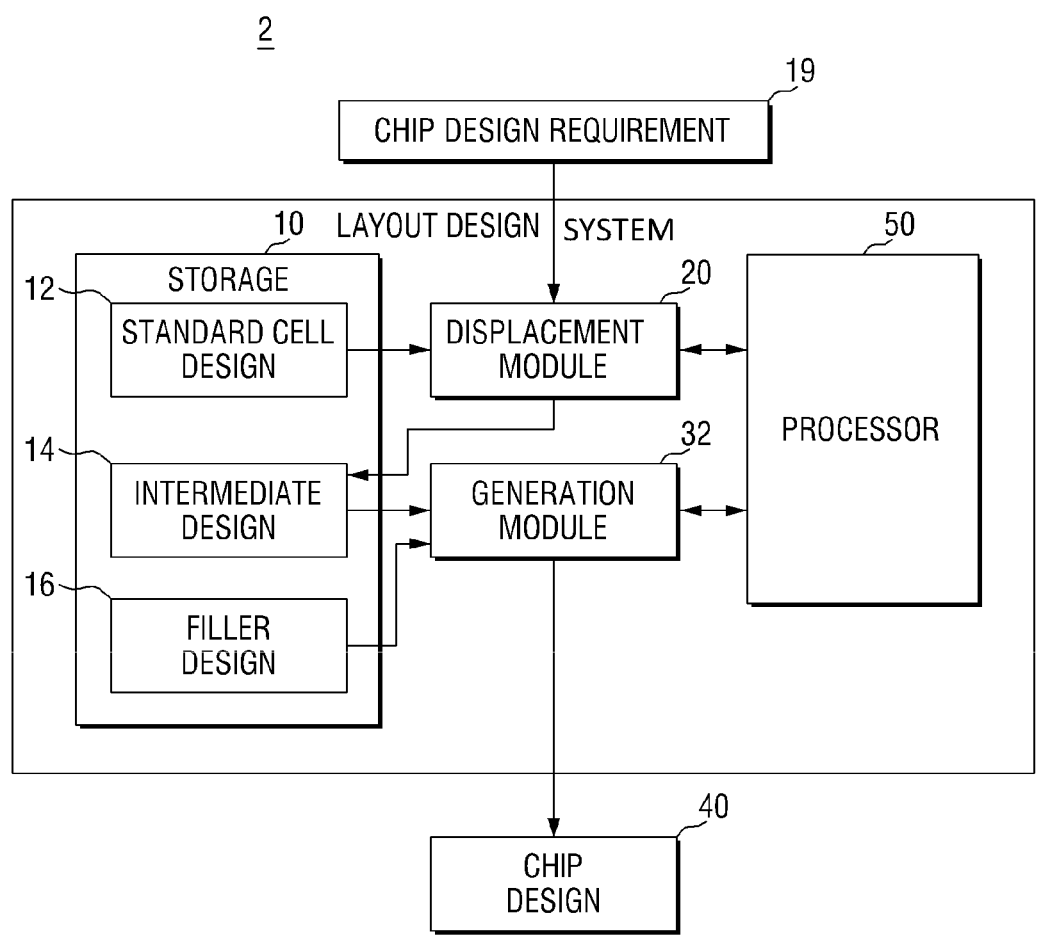
FIG. 7 is a block diagram of a layout design system according to another embodiment of the inventive concept.
Figure 8:
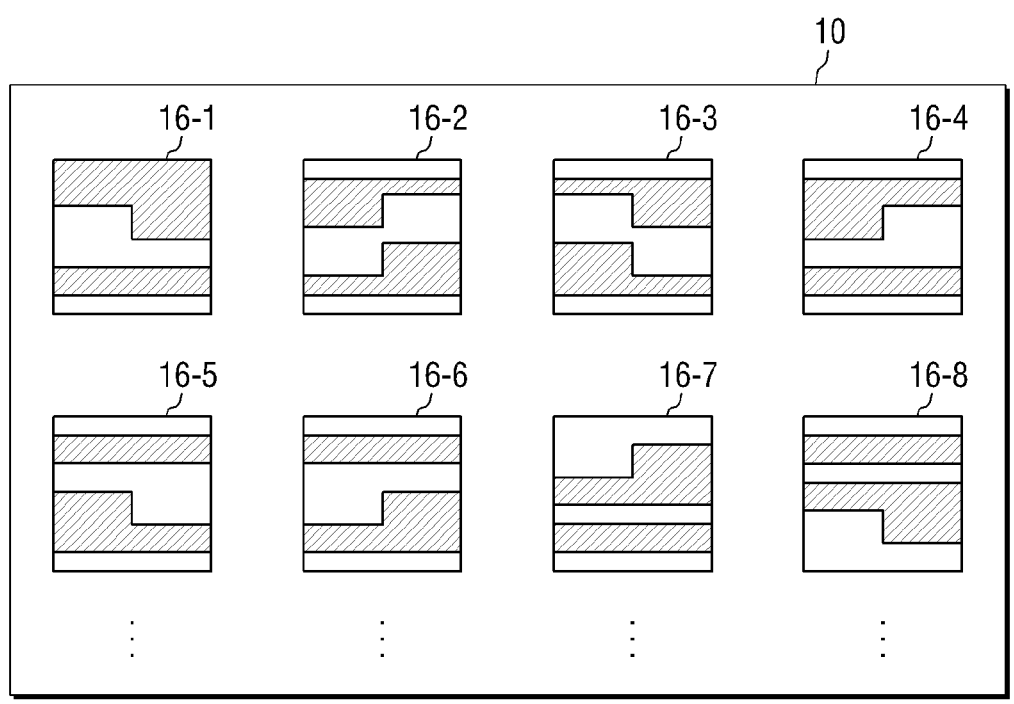
FIG. 8 is a conceptual design further illustrating candidate filler designs that may be used in the system of FIG. 7.

FIG. 7 is a block diagram of a layout design system according to another embodiment of the inventive concept, and FIG. 8 is a conceptual diagram illustrating possible candidate filler designs for a layout design generated by the layout design system of FIG. 7. Hereinafter, duplicate explanations of previously described elements and features will be omitted, and only material points of embodiment differentiation will be presented.

Referring to FIGS. 7 and 8, a plurality of candidate filler designs 16 may also be stored in the storage unit 10 of a layout design system 2.

Specifically, as illustrated in FIG. 8, first through eighth candidate filler designs 16-1 to 16-8 including certain extended active areas having different shapes may be stored in the storage unit 10.

For the embodiment of the inventive concept illustrated in FIG. 7, a generation module 32 replaces a filler design included in an intermediate design 14 using any one of the plurality of candidate filler designs 16 stored in the storage unit 10. That is, the generation module 32 need not always generate a particular filler design based on established markers and pitch definitions. Rather, the intermediate design 14 may be generated by selecting one or more "stock" filler design(s) stored in the storage unit 10 that best corresponds to the necessary extended active areas having identified width(s).

Although the embodiment of FIG. 7 assumes that the generation module 32 selects any one of a plurality of candidate filler designs 16, the scope of the inventive concept is not limited thereto. In other embodiments of the inventive concept, the displacement module 20 may be used to select one or more of a stored plurality of candidate filler designs 16.

Figure 9:
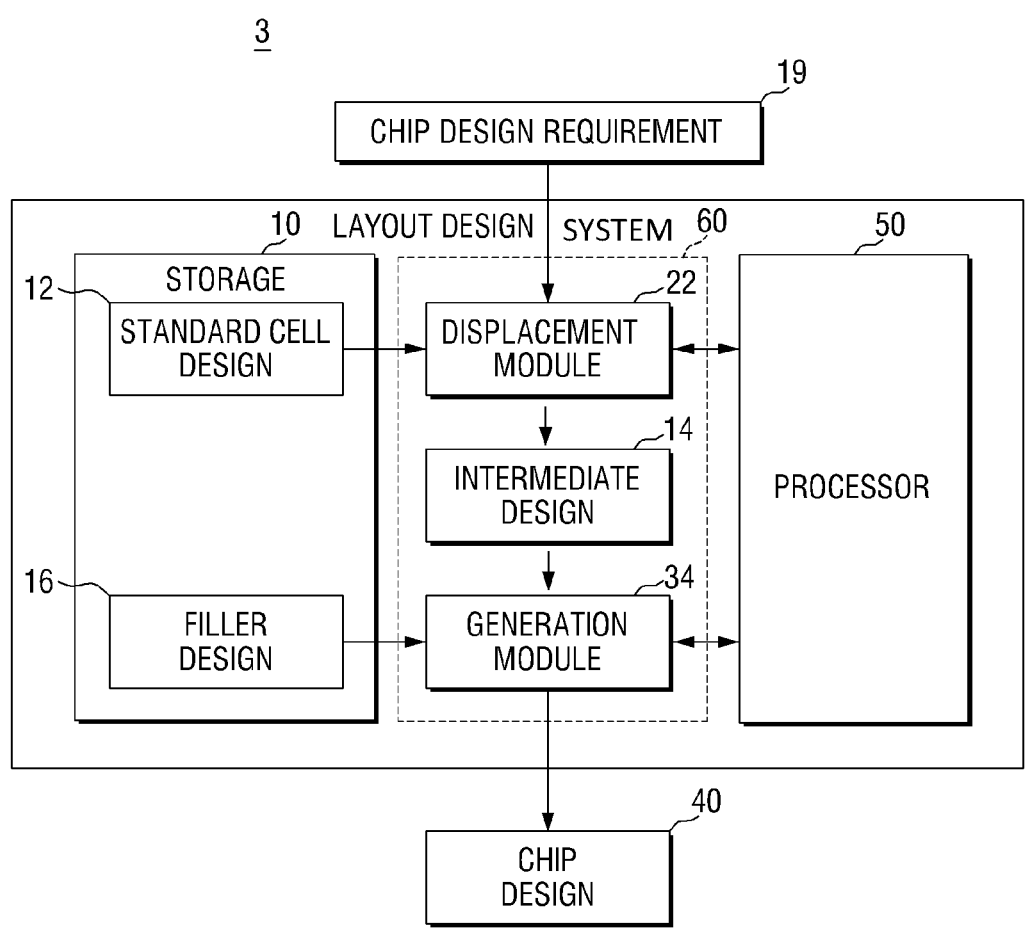
FIG. 9 is a block diagram of a layout design system according to still another embodiment of the inventive concept.

FIG. 9 is a block diagram illustrating a layout design system according to still another embodiment of the inventive concept.

Referring to FIG. 9, in a layout design system 3, a displacement module 22 and a generation module 34 are provided in a single integrated module 60. Accordingly, the intermediate design 14 may be directly communicated from the displacement module 22 to the generation module 34 without being stored in the storage unit 10.

Figure 10:
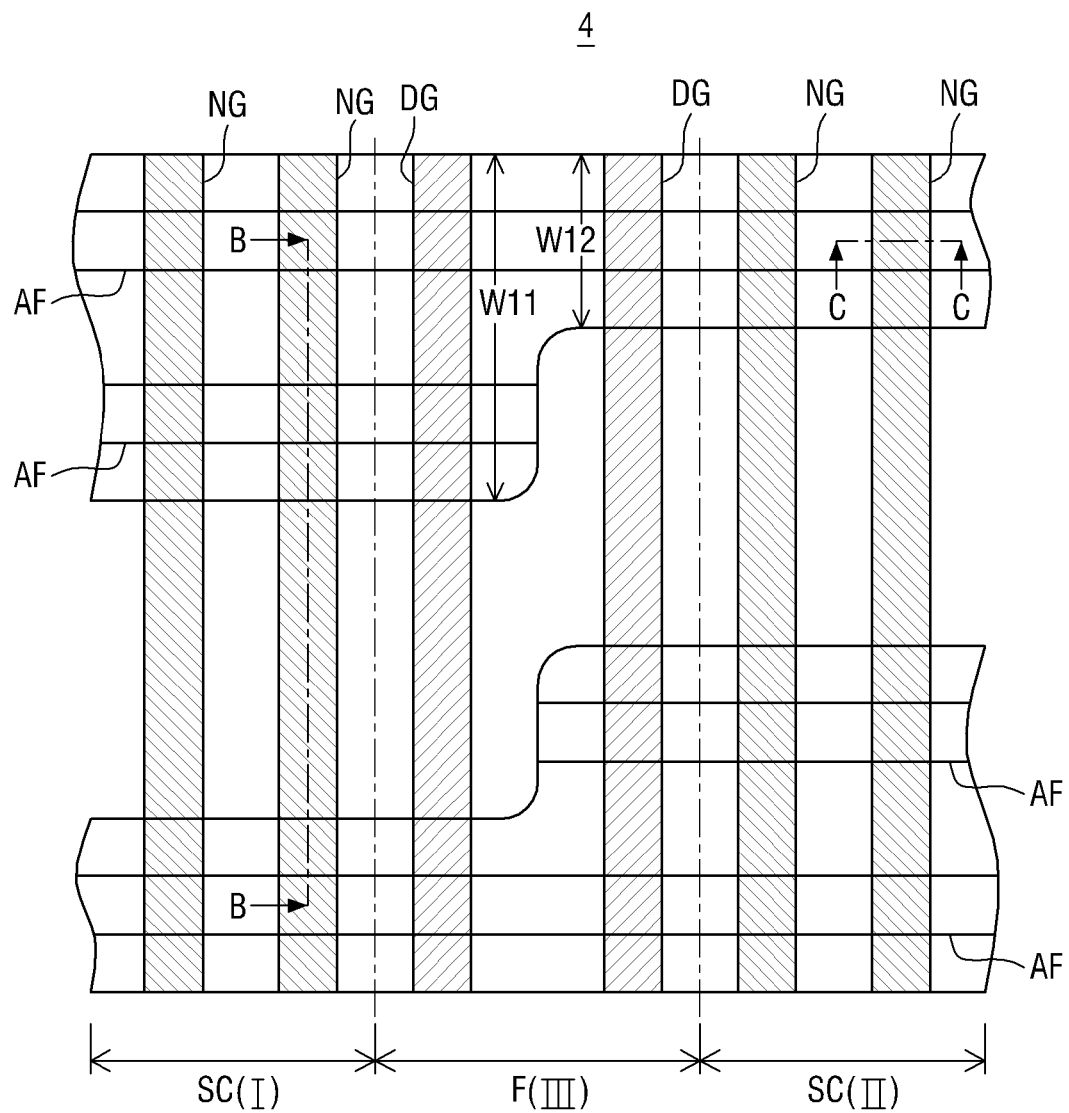
FIG. 10 is a layout diagram illustrating in relevant part a semiconductor device that may be designed and fabricated using a layout design system according to an embodiment of the inventive concept.
Figure 11:
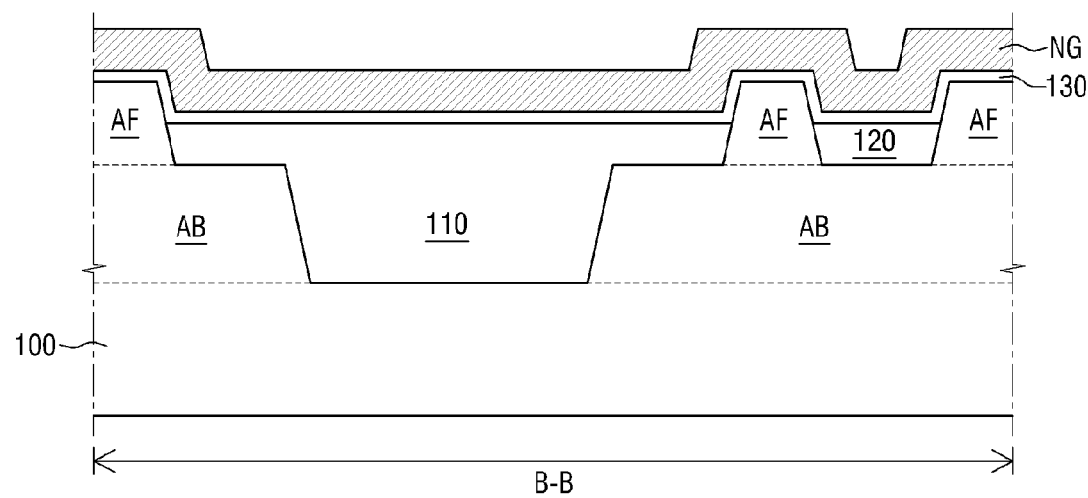
FIG. 11 is a cross-sectional view taken along line B-B of FIG. 10.

FIG. 10 is a layout diagram for a semiconductor device designed using a layout design system according to an embodiment of the inventive concept. FIG. 11 is a cross-sectional view taken along line B-B of FIG. 10, and FIG. 12 is a cross-sectional view taken along line C-C of FIG. 10.

Figure 12:
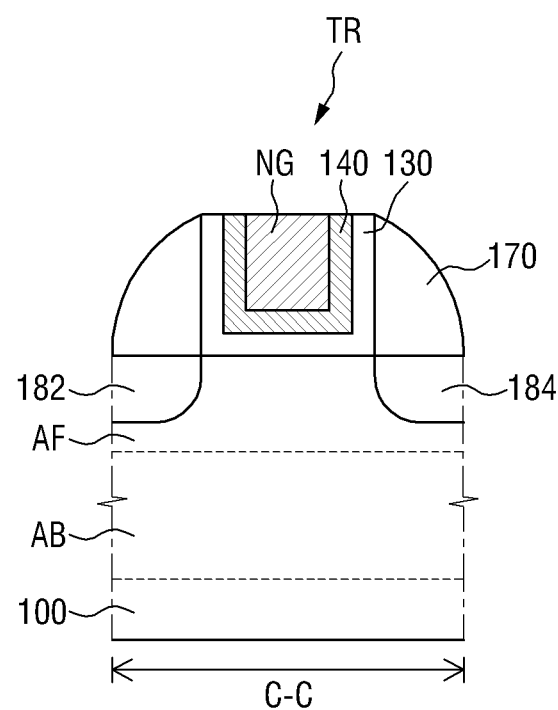
FIG. 12 is a cross-sectional view taken along line C-C of FIG. 10.

Referring to FIGS. 10, 11 and 12, the semiconductor device 4 includes a first area I, a second area II, and a third area III.

The first area I is assumed to be an area where a first standard cell SCI is fabricated in accordance with the first standard cell design 12-1 of FIG. 6. The second area II is further assumed to be an area where a second standard cell SCII is fabricated in accordance with the second standard cell design 12-2 of FIG. 6. The third area III is assumed to be an area where a filler F is fabricated in accordance with the filler design 13 of FIG. 6.

The resulting semiconductor device 4 includes a substrate 100, an active base AB, an active fin AF, a gate insulating layer 130, a normal gate NG, and a dummy gate DG.

The substrate 100 may be a semiconductor substrate, such as one including one or more semiconductor materials selected from the group including Si, Ge, SiGe, GaP, GaAs, SiC, SiGeC, InAs, and InP. The active base AB may also be made of a semiconductor material, and in certain embodiments of the inventive concept, the substrate 100 and active base AB may include one or more of the same material(s).

In certain embodiments of the inventive concept, an insulating substrate may be used as the substrate 100. Specifically, a Silicon On Insulator (SOI) substrate may be used. In such cases, the active fin AF and the active base AB may be formed by forming monocrystalline silicon on a buried oxide layer and patterning the monocrystalline silicon. In this case, the active fin AF and the active base AB may be epitaxial layers. In the case of using the SOI substrate as described above, delay time can be reduced in an operating procedure of the semiconductor device 4.

The active base AB may be formed on the substrate 100. The active base AB may be formed to extend in the first direction X. In this embodiment, the active base AB may be formed in the active area AA of the chip design as illustrated in FIG. 6. That is, the shape of the active base AB may be substantially the same as the shape of the active area AA of the chip design as illustrated in FIG. 6.

As illustrated in FIGS. 10, 11 and 12, on the boundary between the first area I and the third area III, the widths W11 of the active bases AB in the first direction X may be the same. Further, on the boundary between the second area II and the third area III, the widths W12 of the active bases AB in the first direction X may be the same.

Thus, the widths of the active bases AB arranged in the third area III may differ from each other. Particularly, in the case where the semiconductor device 4 according to this embodiment is fabricated using the chip design illustrated in FIG. 6, the width of the active base AB may be changed at a point that corresponds to ½ of the pitch between the first area I and the second area II (see FIG. 5).

The active bases AB may be separated by a Deep Trench Isolation (DTI) 110. Further, active fins AF may be formed on the active bases AB.

As shown, the active fins AF may extend in the first direction X and may be formed on the active bases AB. In this case, the active fins AF may be separated by a Shallow Trench Isolation (STI) 120. In certain embodiments, the depth of the STI 120 may be less than (shallower than) the depth of the DTI 110.

In certain embodiments of the inventive concept, the active fins AF are formed in groups of two, as illustrated. That is, two active fins AF may be formed on one active base AB. This is because the active fins AF are formed by etching the active base AB using two dummy spacers. However, the scope of the inventive concept is not limited thereto, and the arrangement of the active fins AF may be modified according to need.

The cross-section of the active fin AF is illustrated to have a tapered shape in which the width of the cross-section of the active fin AF becomes wider as going from an upper portion to a lower portion thereof, but the scope of the inventive concept is not limited thereto. In certain embodiments of the inventive concept, the cross-section of the active fin AF may be modified to have a rectangular shape. Further, in other embodiments of the inventive concept, the cross-section of the active fin AF may have a chamfered shape. That is, the corner portion of the active fin AF may be rounded.

On the active fin AF, the gate insulating layer 130 may be formed that extends in the second direction Y. The gate insulating layer 130 may be made of, for example, a material having high permittivity. Thus, in some embodiments of the inventive concept, the gate insulating layer 130 may be made of, for example, a material, such as $HfO_2$, $Al_2O_3$, $ZrO_2$, or $TaO_2$.

In an area between the gate insulating layer 130 and the active fin AF, an interface layer may serve to prevent an inferior interface being formed between the gate insulating layer 130 and the active fin AF. The interface layer may include a low-k material layer of which the dielectric constant k is equal to or lower than 9, for example, a silicon oxide layer (where, k is approximately 4) or a silicon oxynitride layer (where, k is approximately 4 to 8 depending on the contents of oxygen atoms and nitrogen atoms). Further, the interface layer may be made of silicate, or may be made of a combination of the above exemplified layers.

As illustrated in FIG. 12, the gate insulating layer 130 may be formed to extend upward along a side wall of a spacer 170. This is because the semiconductor device 4 according to this embodiment is fabricated in a gate last process.

On the gate insulating layer 130, a work function adjustment layer 140 may be formed. The work function adjustment layer 140 may be used to adjust work function. The work function adjustment layer 140 may be formed of a single layer made of metal or a double layer composed of a metal nitride layer and metal. The metal may be, for example, Al, W, Ti, or a combination thereof, and the metal nitride layer may be TiN, TaN, or a combination thereof, but the inventive concept is not limited thereto.

On the work function adjustment layer 140, a normal gate NG and a dummy gate DG may be formed. In this embodiment, the normal gate NG may be formed on a normal gate area NGA of the chip design illustrated in FIG. 6, and the dummy gate DG may be formed on a dummy gate area DGA of the chip design illustrated in FIG. 6. Accordingly, the shape of the normal gate NG and the shape of the normal gate area NGA of the chip design illustrated in FIG. 6 may be substantially the same. Further, the shape of the dummy gate DG and the shape of the dummy gate area DGA of the chip design illustrated in FIG. 6 may be substantially the same.

The normal gate NG and the dummy gate DG may include conductive materials. In some embodiments of the inventive concept, the normal gate NG and the dummy gate DB may include metal having high conductivity, but the inventive concept is not limited thereto. In some embodiments of the inventive concept, the normal gate NG and the dummy gate DB may be made of non-metal, such as poly silicon.

The spacer 170 may be arranged on at least one side of the normal gate NG and the dummy gate DG. Specifically, as illustrated in FIG. 12, the spacer 170 may be arranged on both sides of the normal gate NG and the dummy gate DB. The spacer 170 may include at least one of a nitride layer and an oxynitride layer. Although FIG. 12 illustrates that one side surface of the spacer 170 is curved, the inventive concept is not limited thereto. The shape of the spacer 170 may be differently modified without limit. For example, in some embodiments of the inventive concept, the spacer 170 may be formed in "I" shape or in "L" shape.

In the active fin AF that is positioned on both sides of the normal gate NG, a source area 182 and a drain area 184, which are necessary for the operation of a transistor TR, may be formed. Although FIG. 12 illustrates that the source area 182 and the drain area 184 are formed in the active fin AF, the inventive concept is not limited thereto. As needed, the source area 182 and the drain area 184 may be formed in an epitaxial layer shape in the trench formed in the active fin AF.

Figure 13A:
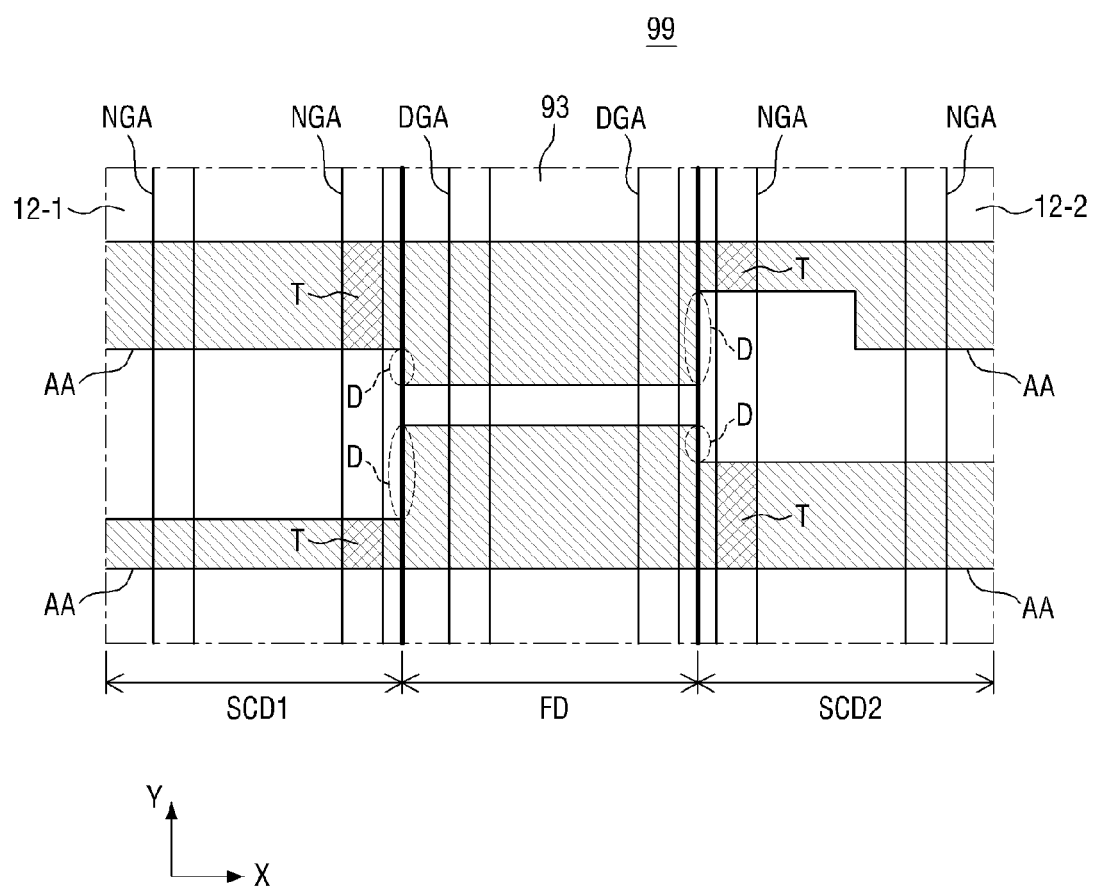
FIGS. 13A and 13B are respective layout diagrams further illustrating the use of a layout design system according to embodiments of the inventive concept.
Figure 13B:
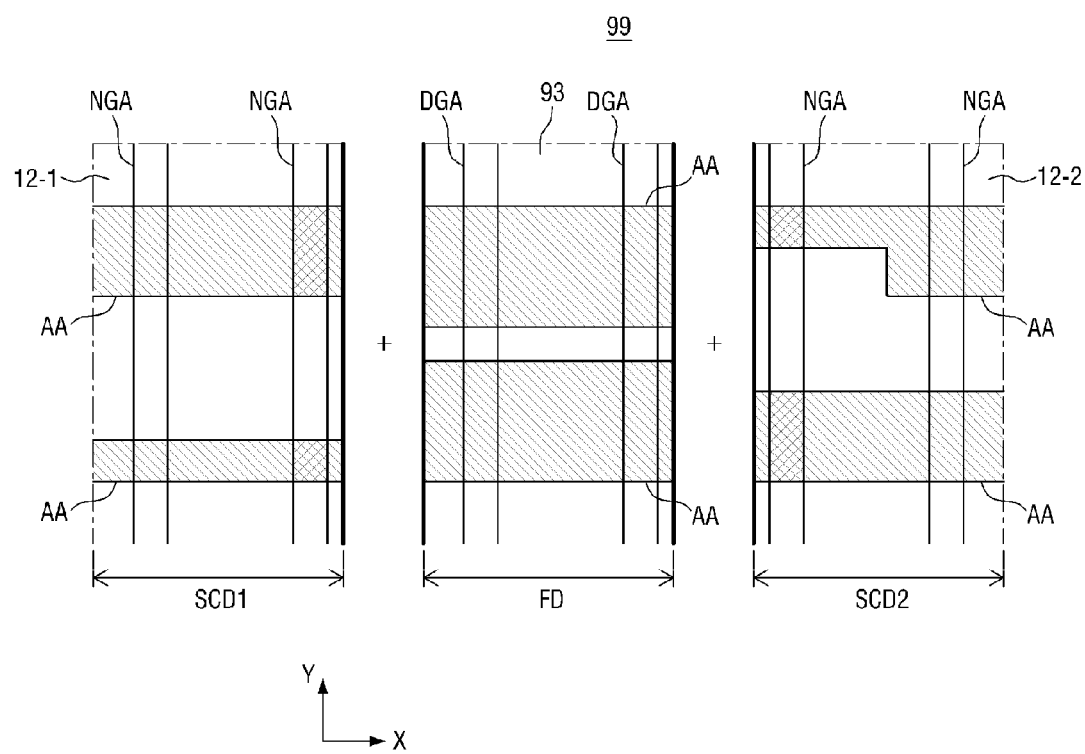

FIGS. 13A and 13B are respective views illustrating certain effects of a layout design system according to embodiments of the inventive concept in the context of comparative examples. That is, FIGS. 13A and 13B illustrate a chip design 99 that is exemplary of layout designs developed using conventional layout design systems.

Referring to FIGS. 13A and 13B, the chip design 99 may include a first standard cell design 12-1, a second standard cell design 12-2, and a filler design 93 that is arranged between the first standard cell design 12-1 and the second standard cell design 12-2.

In the layout design systems described above according to embodiments of the inventive concept, when the filler design 13 (in FIG. 3) is arranged, the filler design 13 (in FIG. 3), is arranged to include various extended active area(s) formed to extend from the adjacent standard cell designs 12-1 and 12-2 according to corresponding markers MK1 to MK4 (in FIG. 5). Accordingly, the width of the active area AA that is arranged in the filler design 13 (in FIG. 6) is not changed at a boundary between the adjacent standard cell designs 12-1 and 12-2 and an adjacent filler design 13 (in FIG. 6), but instead is changed within the filler design 13 (in FIG. 6).

However, if the filler design 93 that includes a predetermined active area AA is arranged between the adjacent standard cell designs 12-1 and 12-2 as illustrated in FIGS. 13A and 13B, the active area AA is changed on the boundary between the standard cell designs 12-1 and 12-2 that are adjacent to the filler design 93.

If the semiconductor device is fabricated using the chip design 99 as described above, the shape of the active base AB may be changed somewhat differently from the shape designed according to the process condition in a step height area D of the active area AA. For example, the active base AB may be over-etched by an applied fabrication process. Thus, the active base AB may be formed with a round shape in a portion that is designed so as to change the width of the active area AA).

If the active base AB is over-etched, a transistor T later formed in the vicinity of boundaries between the standard cell designs 12-1 and 12-2 and the adjacent filler design 93 may experience functional problems. In other words, the product reliability may not be properly secured.

However, layout designs generated by layout design systems according to embodiments of the inventive concept have proper widths associated with active areas arranged adjacent to the filler design 13, such that said widths are not abruptly changed at a boundary between the standard cell designs 12-1 and 12-2 and the adjacent filler design 13. Rather, the widths are changed within the filler design 13 (in FIG. 6) to prevent the occurrence of such problems. Thus, layout designs providing better product reliability may be generated.

Figure 14:
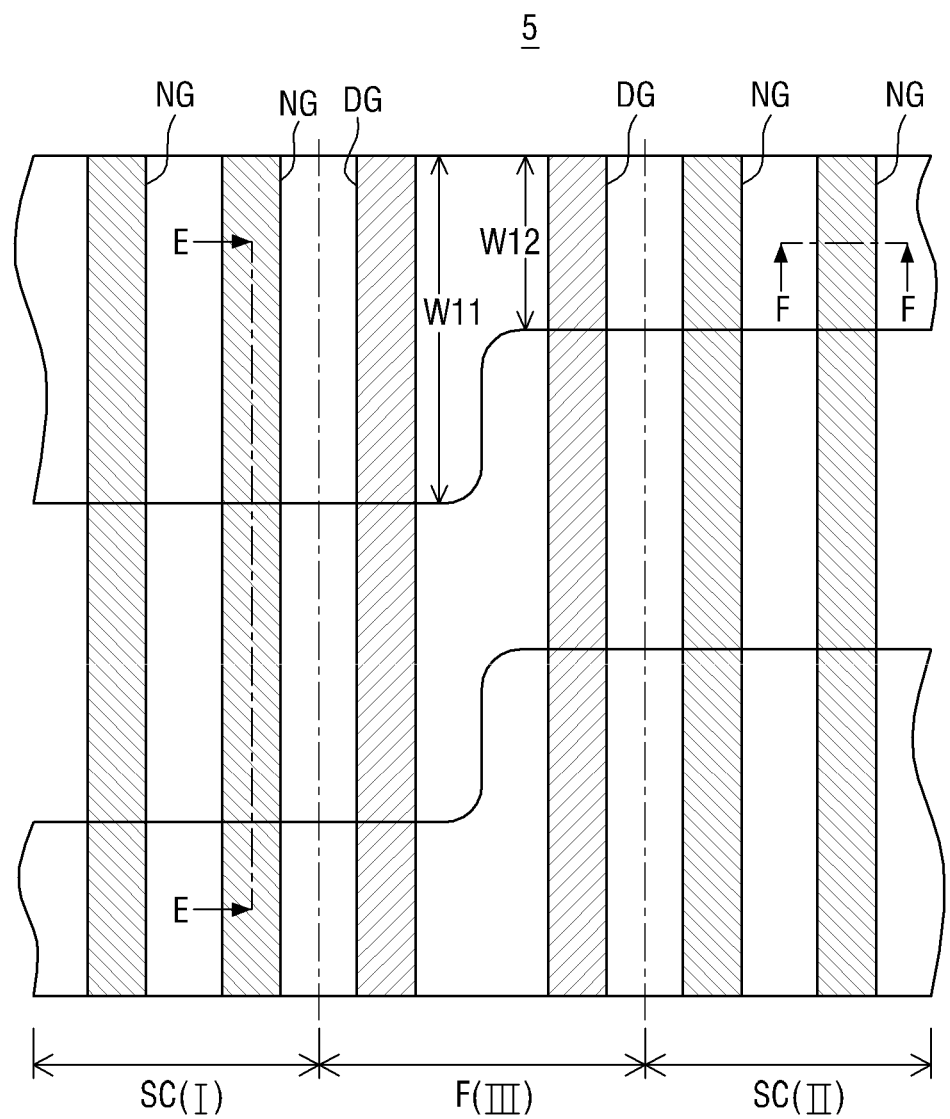
FIG. 14 is a layout diagram illustrating in relevant part another semiconductor device that may be designed and fabricated using a layout design system according to an embodiment of the inventive concept.
Figure 15:
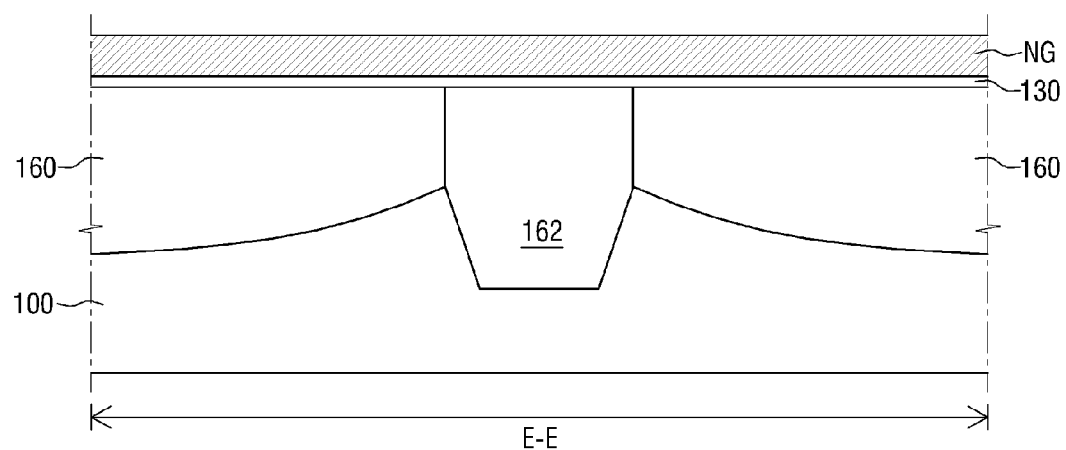
FIG. 15 is a cross-sectional view taken along line E-E of FIG. 14.

FIG. 14 is a layout diagram of another semiconductor device designed using a layout design system according to embodiments of the inventive concept. FIG. 15 is a cross-sectional view taken along line E-E of FIG. 14, and FIG. 16 is a cross-sectional view taken along line F-F of FIG. 14.

Figure 16:
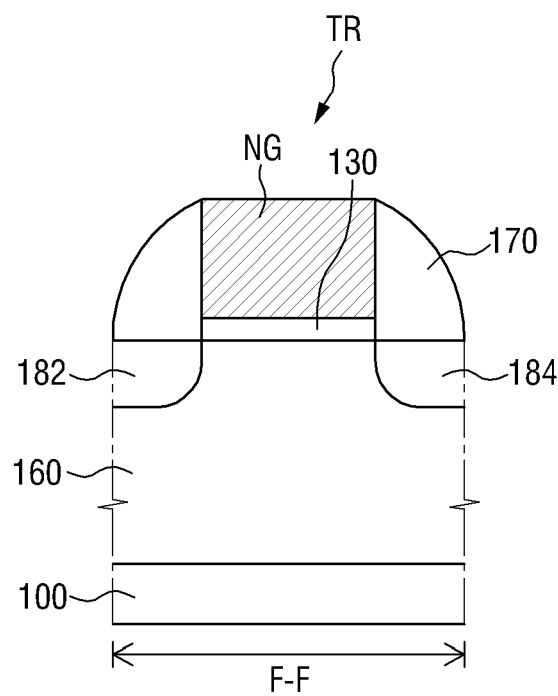
FIG. 16 is a cross-sectional view taken along line F-F of FIG. 14.

Referring to FIGS. 14, 15 and 16, a semiconductor device 5 is different from the semiconductor device 4 previously described in that an impurity area 160 is formed in the active area AA.

That is, in this embodiment, the active area AA illustrated in FIG. 6 becomes the impurity area 160 that is formed by performing a doping process with respect to the substrate 100. As illustrated, the impurity area 160 may be separated through an STI 162 formed in the substrate 100.

In this case, the gate insulating layer 130 does not extend upward along the side wall of the spacer 170 as described above, but may be formed only on lower portions of the normal gate NG and the dummy gate DG, because the semiconductor device 5 is fabricated using a gate first process.

Referring to FIG. 14, even in the semiconductor device 5 the width of the impurity area 160 is not changed at the boundary between the third area III in which the filler F is formed and the first area I in which a standard cell SC is formed or on the boundary between the third area III and the second area II in which the standard cell SC is formed, but is changed in the third area III. Accordingly, the risk that a transistor TR, arranged at the boundary between the first area I and the third area III or the boundary between the second area II and the third area III, being affected by a process condition is reduced. Accordingly, the reliability of the semiconductor device 5 can be improved.

Figure 17:
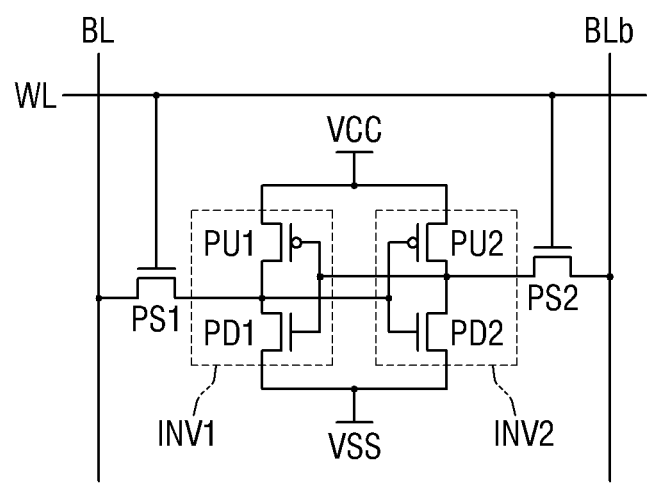
FIG. 17 is a circuit diagram illustrating in one example a memory device that may be included in a semiconductor device designed and fabricated using a layout design according to embodiments of the inventive concept.
Figure 18:
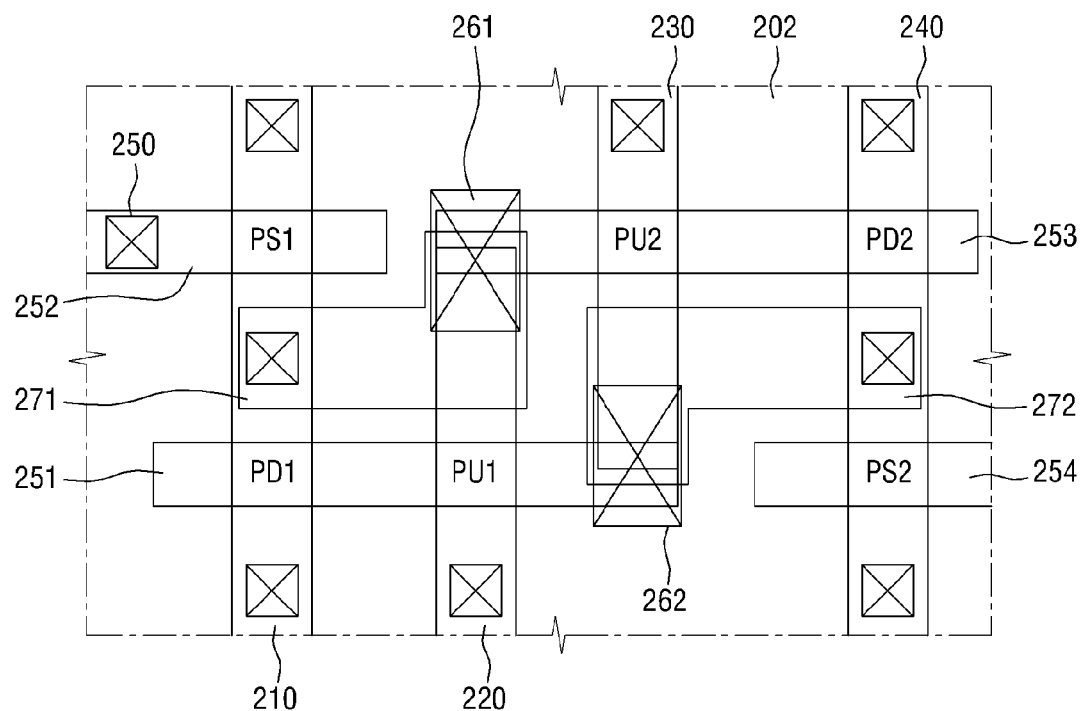
FIG. 18 is a layout diagram further illustrating the memory device of FIG. 17.
Figure 19:
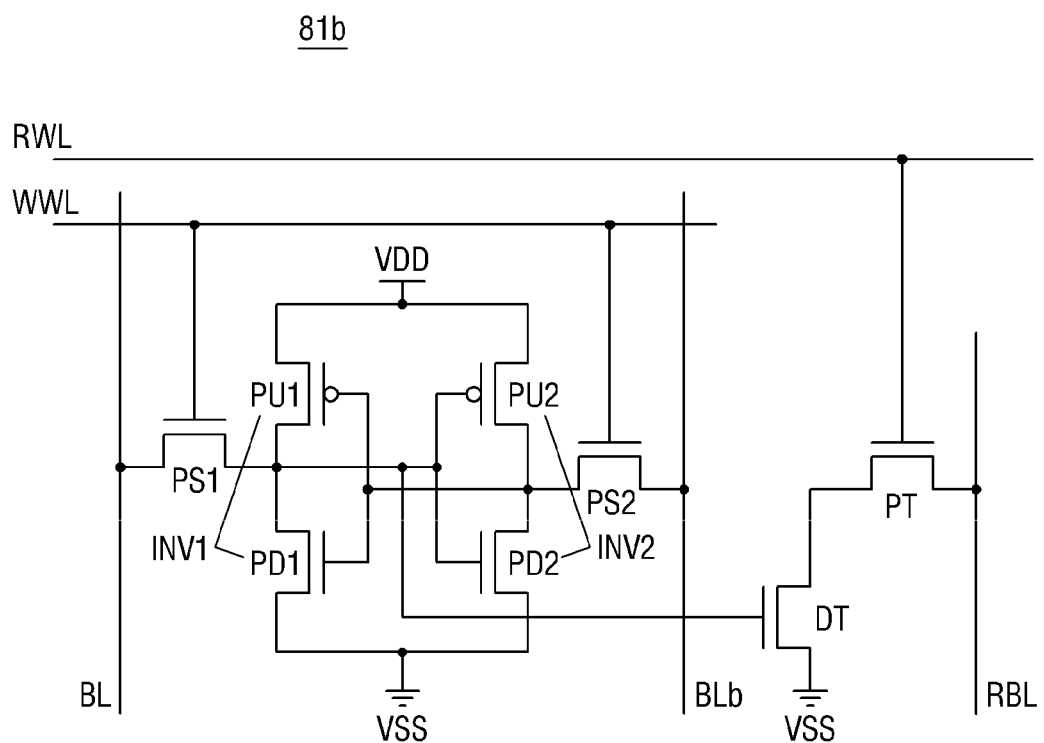
FIG. 19 is another circuit diagram illustrating in another example a memory device that may be included in a semiconductor device according to embodiments of the inventive concept.

FIG. 17 is a circuit diagram illustrating in one example a memory device that may be incorporated into a semiconductor device designed in accordance with an embodiment of the inventive concept. FIG. 18 is a layout diagram for the memory device of FIG. 17. FIG. 19 is another circuit diagram illustrating a memory device that may be incorporated in a semiconductor device designed in accordance with an embodiment of the inventive concept.

Hereinafter, as an example of a SRAM memory device will be presented, but the scope of the inventive concept is not limited thereto.

Referring to FIG. 17, a memory device 81a includes a pair of inverters INV1 and INV2 connected in parallel between a power supply node Vcc and a ground node Vss, a first path transistor PS1 and a second pass transistor PS2 connected to output nodes of the respective inverters INV1 and INV2. The first pass transistor PS1 and the second pass transistor PS2 may be connected to a bit line BL and a complementary bit line BLb. Gates of the first pass transistor PS1 and the second pass transistor PS2 may be connected to a word line WL.

The first inverter INV1 includes a first pull-up transistor PU1 and a first pull-down transistor PD1 which are connected in series, and the second inverter INV2 includes a second pull-up transistor PU2 and a second pull-down transistor PD2. The first pull-up transistor PU1 and the second pull-up transistor PU2 may be PFET transistors, and the first pull-down transistor PD1 and the second pull-down transistor PD2 may be NFET transistors.

Further, the first inverter INV1 and the second inverter INV2 may constitute one latch circuit in a manner that an input node of the first inverter INV1 is connected to an output node of the second inverter INV2, and an input node of the second inverter INV2 is connected to an output node of the first inverter INV1.

Here, again referring to FIG. 18, a first active fin 210, a second active fin 220, a third active fin 230, and a fourth active fin 240, which are spaced apart from each other, are formed to extend long in one direction (for example, upper/lower direction in FIG. 15). The extending length of the second active fin 220 and the third active fin 230 may be shorter than the extending length of the first active fin 210 and the fourth active fin 240.

Further, a first gate electrode 251, a second gate electrode 252, a third gate electrode 253, and a fourth gate electrode 254 extend long in the other direction (for example, right/left direction in FIG. 15), and are formed to cross the first to fourth active fins 210 to 240. Specifically, the first gate electrode 251 may be formed to completely cross the first active fin 210 and the second active fin 220 and to partially overlap a vertical end of the third active fin 230. The third gate electrode 253 may be formed to completely cross the fourth active fin 240 and the third active fin 230 and to partially overlap a vertical end of the second active fin 220. The second gate electrode 252 and the fourth gate electrode 254 may be formed to cross the first active fin 210 and the fourth active fin 240, respectively.

As illustrated, the first pull-up transistor PU1 is defined around a region where the first gate electrode 251 and the second active fin 220 cross each other, the first pull-down transistor PD1 is defined around a region where the first gate electrode 251 and the first active fin 210 cross each other, and the first pass transistor PS1 is defined around a region where the second gate electrode 252 and the first active fin 210 cross each other. The second pull-up transistor PU2 is defined around a region where the third gate electrode 253 and the third active fin 230 cross each other, the second pull-down transistor PD2 is defined around a region where the third gate electrode 253 and the fourth active fin 240 cross each other, and the second pass transistor PS2 is defined around a region where the fourth gate electrode 254 and the fourth active fin 240 cross each other.

Although not clearly illustrated, source/drain may be formed on both sides of areas where the first to fourth gate electrodes 251 to 254 and the first to fourth active fins 210, 220, 230, and 240 cross each other, and a plurality of contacts 250 may be formed in the same manner.

In addition, a shared contact 261 may simultaneously connect the second active fin 220, the third gate electrode 253, and a wiring 271. A shared contact 262 may simultaneously connect the third active fin 230, the first gate electrode 251, and a wiring 272.

Here, the first to fourth gate electrodes 251 to 254 and the first to fourth active fins 210, 220, 230, and 240 may be formed by designs generated using the layout design systems 1 to 3 according to the embodiments of the inventive concept.

The memory device 81a described above is a 6T SRAM including 6 transistors, but the scope of the inventive concept is not limited thereto. Hereinafter, referring to FIG. 19, another memory device is analogously described.

Referring to FIG. 19, a memory device 81b includes first and second inverters INV1 and INV2 connected in parallel between a power supply node VDD and a ground node VSS, a first selection transistor PS1 and a second selection transistor PS2 connected to output nodes of the respective inverters INV1 and INV2, a drive transistor DT controlled by an output of the first inverter INV1, and a pass transistor PT connected to an output node of the drive transistor DT. That is, in this embodiment, the memory device 81b may be an 8T SRAM that is composed of 8 transistors.

The first selection transistor PS1 and the second selection transistor PS2 may be connected to a bit line BL and a complementary bit line BLb. Gates of the first selection transistor PS1 and the second selection transistor PS2 may be connected to a write word line WWL.

The first inverter INV1 includes a first pull-up transistor PU1 and a first pull-down transistor PD1 which are connected in series, and the second inverter INV2 includes a second pull-up transistor PU2 and a second pull-down transistor PD2. The first pull-up transistor PU1 and the second pull-up transistor PU2 may be PFET transistors, and the first pull-down transistor PD1 and the second pull-down transistor PD2 may be NFET transistors.

Further, the first inverter INV1 and the second inverter INV2 may constitute one latch circuit in a manner that an input node of the first inverter INV1 is connected to an output node of the second inverter INV2, and an input node of the second inverter INV2 is connected to an output node of the first inverter INV1.

The drive transistor DT and the pass transistor PT may be used to read data stored in the latch circuit that is composed of the first inverter INV1 and the second inverter INV2. A gate of the drive transistor DT may be connected to the output node of the first inverter INV1, and a gate of the pass transistor PT may be connected to a read word line RWL. As illustrated, the output of the drive transistor DT may be connected to the ground node VSS, and an output of the pass transistor PT may be connected to a read bit line RBL.

Through the above-described circuit configuration, in the memory device according to this embodiment, the data stored in the SRAM device can be accessed through two ports (e.g., double port). First, through selection of the write work line WWL, the bit line BL, and the complementary bit line BLb, data can be written in or can be read from the latch circuit that is composed of the first inverter INV1 and the second inverter INV2. Further, through selection of the read write line RWL and the read bit line RBL, the data stored in the latch circuit that is composed of the first inverter INV1 and the second inverter INV2 can be read. That is, this path may be used as a second port.

In the SRAM device described above, data reading based on the second port can be performed independently of the operation based on the first port, and thus exerts no influence on the data stored in the latch circuit. In other words, the reading of the data stored in the latch circuit and writing of the data in the latch circuit may be independently performed.

Figure 20:
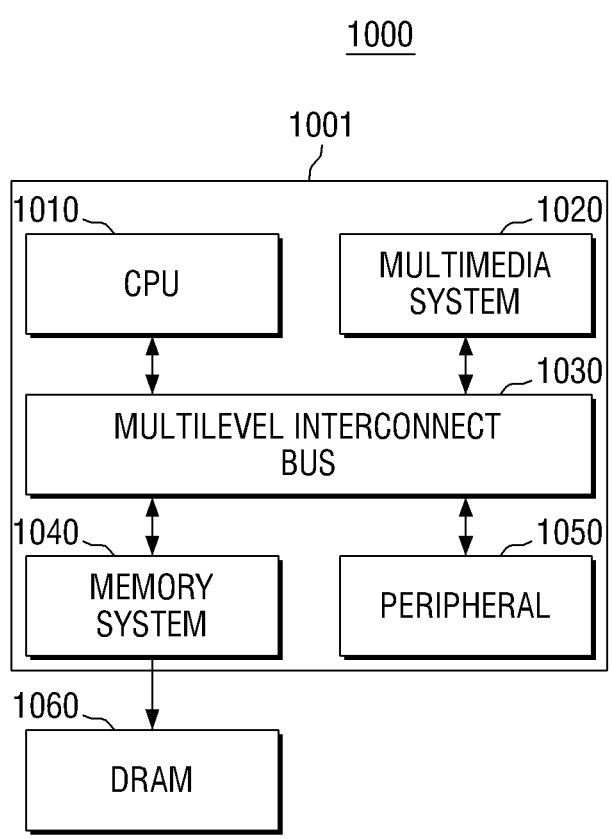
FIG. 20 is a block diagram of a System-on-Chip (SoC) that may incorporate one or more semiconductor device(s) designed and fabricated using a layout design system according to embodiments of the inventive concept.
Figure 21:
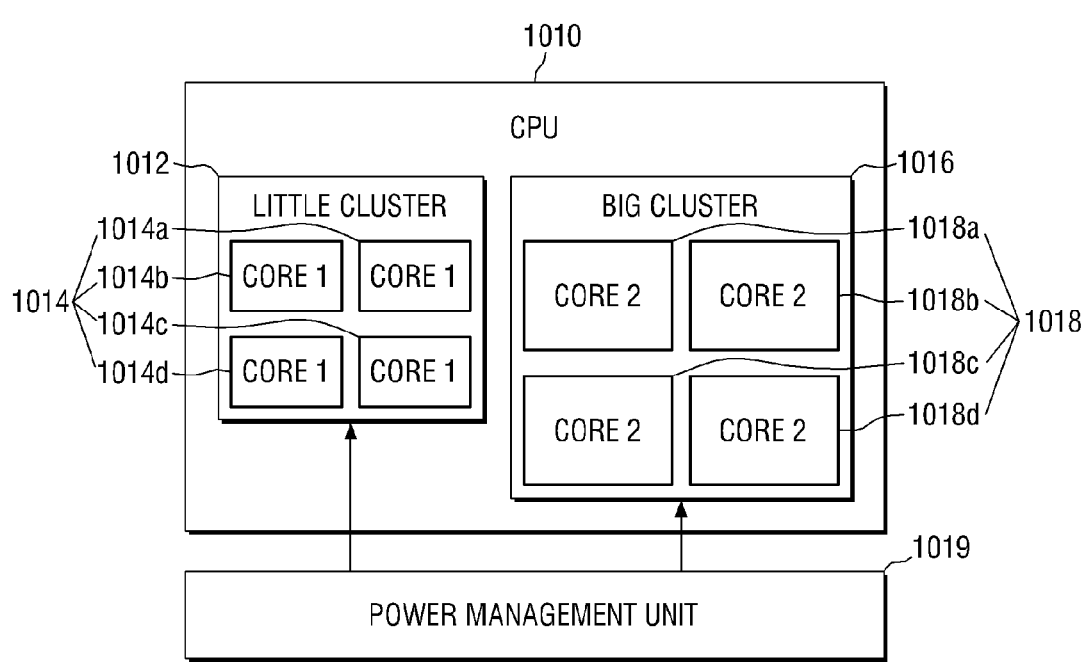
FIG. 21 is a block diagram further illustrating one possible configuration of the central processing unit 1010 of FIG. 20.
Figure 22:
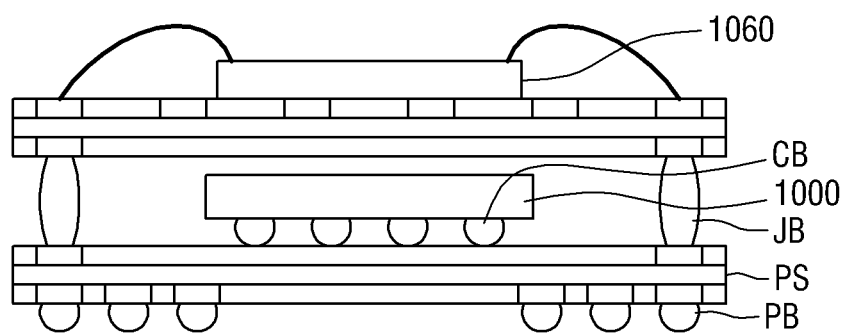
FIG. 22 is a device cross-section illustrating a packaged semiconductor device for the SoC of FIG. 20.

FIG. 20 is a block diagram illustrating a System-on-Chip (SoC) that may include one or more semiconductor device (s) designed in by a layout design system according to embodiments of the inventive concept. FIG. 21 is a block diagram further illustrating the central processing unit 1010 of FIG. 20, and FIG. 22 is a cross-section view illustrating one packaging approach for the semiconductor device of FIG. 20.

Referring to FIG. 20, a SoC system 1000 generally includes an application processor 1001 and a DRAM 1060.

The application processor 1001 may include a Central Processing Unit (CPU) 1010, a multimedia system 1020, a bus 1030, a memory system 1040, and a peripheral circuit 1050.

The CPU 1010 may perform operation that is required to drive the SoC system 1000. In some embodiments of the inventive concept, the CPU may be configured in a multi-core environment including a plurality of cores.

In some embodiments of the inventive concept, the CPU 1010, as illustrated in FIG. 21, may include a first cluster 1012 and a second cluster 1016.

The first cluster 1012 may be arranged inside the CPU 1010, and may include n (here, n is a natural number) first cores 1014. In FIG. 21, for convenience in explanation, it is exemplified that the first cluster 1012 includes four (i.e., n=4) first cores 1014*a* to 1014*d*, but the inventive concept is not limited thereto.

In the same manner, the second cluster 1016 may be arranged inside the CPU 1010, and may include n second cores 1018. As illustrated, the second cluster 1016 may be arranged separately from the first cluster 1012. Here, for convenience in explanation, it is exemplified that the second cluster 1016 includes four (i.e., n=4) second cores 1018*a* to 1018*d*, but the inventive concept is not limited thereto.

FIG. 21 illustrates that the number of first cores 1014 included in the first cluster 1012 and the number of second cores 1018 included in the second cluster 1016 are equal to each other, but the inventive concept is not limited thereto. In some embodiments of the inventive concept, the number of first cores 1014 included in the first cluster 1012 and the number of second cores 1018 included in the second cluster 1016 may be different from each other.

Further, FIG. 21 illustrates that only the first cluster 1012 and the second cluster 1016 are arranged in the CPU 1010, but the inventive concept is not limited thereto. As needed, a third cluster (not illustrated) including a third core (not illustrated) may be additionally arranged separately from the first and second clusters 1012 and 1016 in the CPU 1010.

In this embodiment, the amount of operation per unit time of the first core 1014 included in the first cluster 1012 and the amount of operation per unit time of the second core 1018 included in the second cluster 1016 may be different from each other.

In some embodiments of the inventive concept, the first cluster 1012 may be, for example, a little cluster, and the second cluster 1016 may be a big cluster. In this case, the amount of operation per unit time of the first core 1014 included in the first cluster 1012 may be smaller than the amount of operation per unit time of the second core 1018 included in the second cluster 1016.

Accordingly, the amount of operation per unit time in the case where all the first cores 1014 included in the first cluster 1012 are enabled to perform operations may be smaller than the amount of operation per unit time in the case where all the second cores 1018 included in the second cluster 1016 are enabled to perform operations.

In this embodiment, the amounts of operation per unit time of the (1-1)-th to (1-4)-th cores 1014*a* to 1014*d* included in the first cluster 1012 may be equal to each other, and the amounts of operation per unit time of the (2-1)-th to (2-4)-th cores 1018*a* to 1018*d* included in the second cluster 1016 may also be equal to each other. That is, for example, if it is assumed that the amount of operation per unit time of each of the (1-1)-th to (1-4)-th cores 1014*a* to 1014*d* is 10, the amount of operation per unit time of each of the second cores 1018*a* to 1018*d* may be 40.

The power management unit 1019 may enable or disable the first cluster 1012 and the second cluster 1016 as needed. Specifically, if an operation of the first cluster 1012 is required, the power management unit 1019 may enable the first cluster 1012 and may disable the second cluster 1016. In contrast, if an operation of the second cluster 1016 is required, the power management unit 1019 may enable the second cluster 1016 and may disable the first cluster 1012. Further, if the amount of operation to be performed can be sufficiently processed through the (1-1)-th core 1014*a* included in the first cluster 1012, the power management unit 1019 may enable the first cluster 1012, specifically, may enable the (1-1)-th core 1014*a* and may disable the (1-2)-th to (1-4)-th cores 1014*b* to 1014*d* in the first cluster 1012, and may disable the second cluster 1016. In other words, the power management unit 1019 according to this embodiment may determine whether the first and second clusters 1012 and 1016 are enabled as a whole, and may determine whether the (1-1)-th to (1-4)-th cores 1014*a* to 1014*d* included in the first cluster 1012 and the (2-1)-th to (2-4)-th cores 1018*a* to 1018*d* included in the second cluster 1016 are enabled, respectively.

In some embodiments of the inventive concept, the power management unit 1019 may enable the first and second clusters 1012 and 1016 and/or the cores 1014*a* to 1014*d* and 1018*a* to 1018*d* included therein through power supply to the first and second clusters 1012 and 1016 and/or the cores 1014*a* to 1014*d* and 1018*a* to 1018*d* included therein to operate them. Further, the power management unit 1019 may disable the first and second clusters 1012 and 1016 and/or the cores 1014*a* to 1014*d* and 1018*a* to 1018*d* included therein through interception of the power supply to the first and second clusters 1012 and 1016 and/or the cores 1014*a* to 1014*d* and 1018*a* to 1018*d* included therein to interrupt their operations.

As described above, the power management unit 1019 can manage the whole power consumption of the SoC system 1000 through enabling of only the specific clusters 1012 and 1016 and/or the plurality of cores 1014*a* to 1014*d* and 1018*a* to 1018*d* in accordance with the operation environment of the SoC system 1000.

Referring again to FIG. 20, the multimedia system 1020 may be used to perform various kinds of multimedia functions in the SoC system 1000. The multimedia system 1020 may include a 3D engine module, a video codec, a display system, a camera system, and a post-processor.

A bus 1030 may be used for the CPU 1010, the multimedia system 1020, the memory system 1040, and the peripheral circuit 1050 to perform data communication with each other. In some embodiments of the inventive concept, the bus 1030 may have a multilayer structure. Specifically, the bus 1030 may be a multilayer Advanced High-performance Bus (AHB) or a multilayer Advanced eXtensible Interface (AXI), but the scope of the inventive concept is not limited thereto.

The memory system 1040 may provide a necessary environment in which the application processor 1001 is connected to an external memory (e.g., DRAM 1060) to perform high-speed operation. In some embodiments of the inventive concept, the memory system 104 may include a separate controller (e.g., DRAM controller) for controlling the external memory (e.g., DRAM 1060).

The peripheral circuit 1050 may provide a necessary environment in which the SoC system 1000 is smoothly connected to an external device (for example, main board). Accordingly, the peripheral circuit 1050 may include various interfaces that can make the external device compatible with the SoC system 1000.

The DRAM 1060 may function as an operating memory that is required for the operation of the application processor 1001. In some embodiments of the inventive concept, the DRAM 1060 may be arranged outside the application processor 1001. Specifically, the DRAM 1060 may be packaged in a Package on Package (PoP) form with the application processor 110 as illustrated in FIG. 22.

Referring to FIG. 22, such a semiconductor package may include a package substrate PS, a DRAM 1060, and an application processor 1001.

The package substrate PS may include a plurality of package balls PB. The plurality of package balls P_B may be electrically connected to chip balls CB of the application processor 1001 through signal lines inside the package substrate PS, and may also be electrically connected to joint balls JB through signal lines inside the package substrate PS.

On the other hand, the DRAM 1060 may be electrically connected to the joint balls JB through wire bonding as illustrated.

The application processor 1001 may be arranged on a lower portion of the DRAM 1060. The chip balls CB of the application processor 1001 may be electrically connected to the DRAM 1060 through the joint balls JB.

Although FIG. 22 illustrates that the DRAM 1060 is arranged outside the application processor 1001, the scope of the inventive concept is not limited thereto. As needed, the DRAM 1060 may be arranged inside the application processor 1001.

At least one of constituent elements of the SoC system 1000 as described above may be manufactured using the layout design systems 1 to 3 according to the embodiments of the inventive concept. Further, the semiconductor devices 4 and 5 according to the embodiments of the inventive concept as described above may be provided as one of the constituent elements of the SoC system 1000.

Next, referring to FIG. 23, an electronic system including a semiconductor device according to embodiments of the inventive concept will be described.

Figure 23:
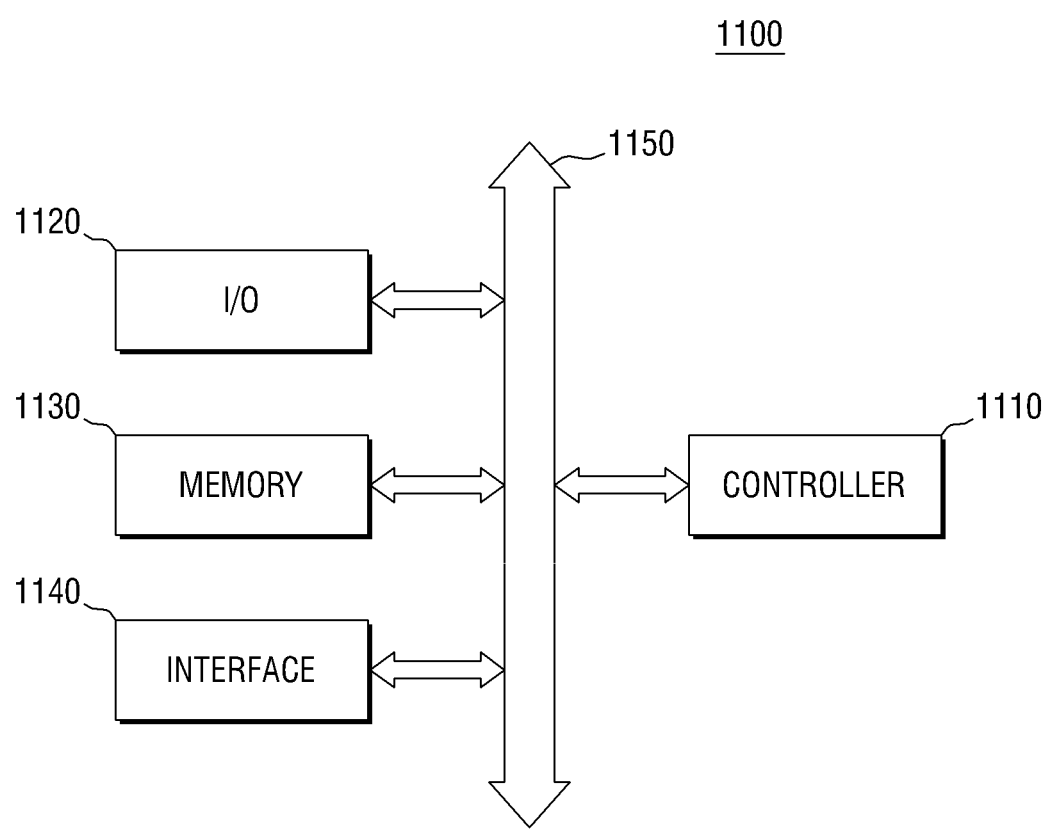
FIG. 23 is a block diagram of an electronic system that may incorporate a semiconductor device designed and fabricated using a layout design system according to an embodiment of the inventive concept.

FIG. 23 is a block diagram of an electronic system that may incorporate one or more semiconductor device(s) designed using a layout design system in accordance with embodiments of the inventive concept.

Referring to FIG. 23, an electronic system 1100 includes a controller 1110, an input/output (I/O) device 1120, a memory 1130, an interface 1140, and a bus 1150. The controller 1110, the I/O device 1120, the memory 1130, and/or the interface 1140 may be coupled to one another through the bus 1150. The bus 1150 corresponds to paths through which data is transferred.

The controller 1110 may include at least one of a microprocessor, a digital signal processor, a microcontroller, and logic elements that can perform similar functions. The I/O device 1120 may include a keypad, a keyboard, and a display device. The memory 1130 may store data and/or commands. The interface 1140 may function to transfer the data to a communication network or receive the data from the communication network. The interface 1140 may be of a wired or wireless type. For example, the interface 1140 may include an antenna or a wire/wireless transceiver.

Although not illustrated, the electronic system 1100 may further include a high-speed DRAM and/or SRAM as an operating memory for improving the operation of the controller 1110. In this case, as the operating memory, any one of the semiconductor devices 1 to 6 according to the above-described embodiments of the inventive concept may be adopted. Further, any one of the semiconductor devices 1 to 6 according to the above-described embodiments of the inventive concept may be provided in the memory 1130, or may be provided as a part of the controller 1110 or the I/O device 1120.

The electronic system 1100 may be applied to a Personal Digital Assistant (PDA), a portable computer, a web tablet, a wireless phone, a mobile phone, a digital music player, a memory card, or all electronic devices that can transmit and/or receive information in wireless environments.

Figure 24:
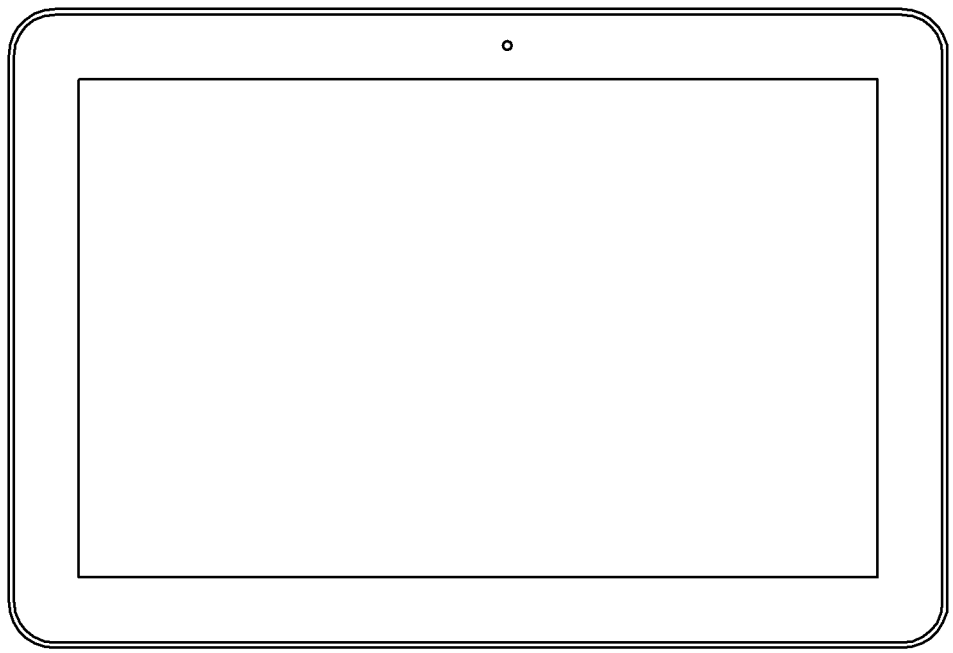
FIGS. 24, 25 and 26 are respective views of various systems that may incorporate one or more semiconductor device(s) designed and fabricated using a layout design system according to an embodiment of the inventive concept.
Figure 25:
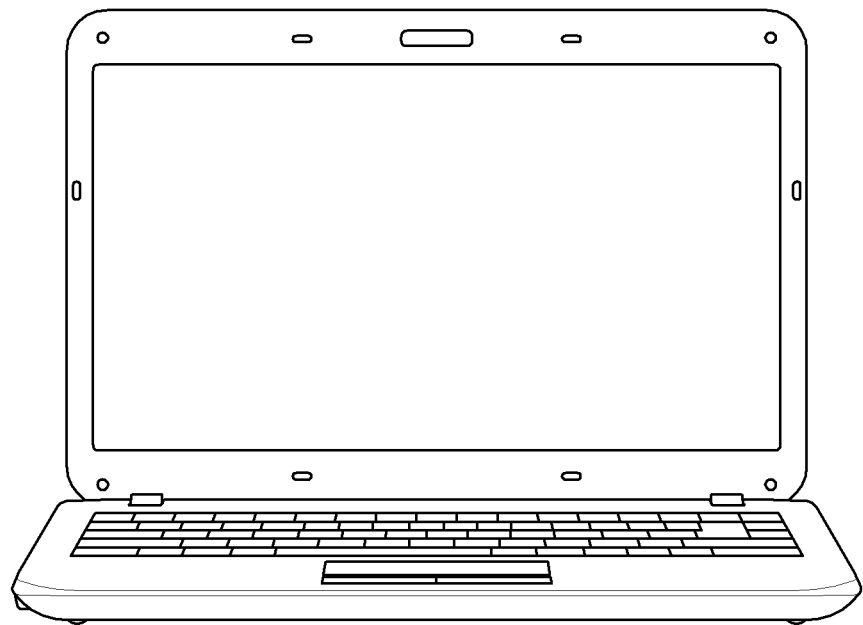
Figure 26:
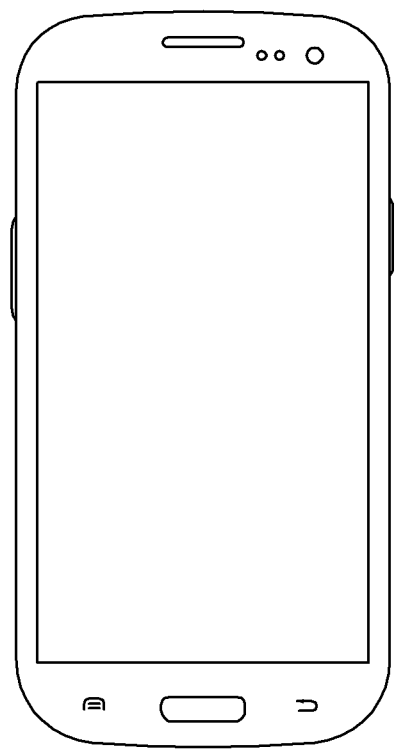

FIGS. 24, 25 and 26 are diagrams illustrating certain devices that may incorporate one or more semiconductor devices designed using a layout design system according to embodiments of the inventive concept.

FIG. 24 illustrates a tablet PC 1200. FIG. 25 illustrates a notebook computer 1300, and FIG. 26 illustrates a smart phone 1400. At least one of the semiconductor devices 4 and 5 according to the embodiments of the inventive concept may be used in the tablet PC 1200, the notebook computer 1300, or the smart phone 1400.

Further, it will be apparent to those of skilled in the art that one or more semiconductor devices designed using a layout design system according to an embodiment of the inventive concept may be incorporated into the illustrated devices. Of course, the tablet PC 1200, notebook computer 1300, and/or smart phone 1400 may also include semiconductor devices otherwise designed. In certain other embodiments of the inventive concept, one or more semiconductor designed using a layout design system may be implemented as a computer, Ultra Mobile PC UMPC), workstation, net-book, PDA, wireless phone, mobile phone, e-book, Portable Multimedia Player (PMP), portable game machine, navigation device, black box, digital camera, 3D television set, digital audio recorder, digital audio player, digital picture recorder, digital picture player, digital video recorder, or digital video player.

Although certain embodiments of the inventive concept have been described for illustrative purposes, those skilled in the art will appreciate that various modifications, additions and substitutions are possible, without departing from the scope of the inventive concept as defined by the accompanying claims.

What is claimed is:

1. A layout design system that receives a chip design requirement and provides a corresponding chip design to a circuit that stores the chip design, the layout design system comprising:
 a processor;
 a storage unit that stores a first standard cell design
  defining a first active area having a first width and a second standard cell design defining a second active area having a second width different from the first width; and a displacement module operating in conjunction with the processor and configured to;

arrange the first standard cell design in a first area and the second standard cell in a second area to generate an intermediate design in accordance with the chip design requirement, wherein the first area and the second area are separated in the intermediate design by a filler design having no active area, generate a first marker corresponding to the first width at a first boundary between the filler design and the first area and a second marker corresponding to the second width at a second boundary between the filler design and the second area, such that the first marker and the second marker are defined in the intermediate design, and store the intermediate design in the storage unit.

2. The layout design system of claim 1, wherein the displacement module is further configured to measure a pitch separating the first standard cell design and the second standard cell design across the filler design, and to define a first length for the first marker and a second length for the second marker in accordance with the pitch.

3. The layout design system of claim 2, wherein the displacement module defines each one of the first length and the second length as being ½ of the pitch.

4. The layout design system of claim 1, further comprising:

a generation module operating in conjunction with the processor, and configured to;

receive the intermediate design from the storage unit, modify the intermediate design by generating a first extended active area having the first width and extending the first length from the first boundary into a filler area defined by the filler design and by generating a second extended active area having the second width and extending the second length from the second boundary into the filler area to meet the first extended active area, generate the chip design in accordance with the modified intermediate design, and provide the chip design to the circuit storing the chip design.

5. The layout design system of claim 4, wherein the displacement module is further configured to generate the intermediate design with a normal gate area disposed in one of the first area and the second area, and the generation module is further configured to generate the chip design with a dummy gate area disposed in the filler area and arranged in parallel with the normal gate area.

6. The layout design system of claim 5, wherein at least one of the displacement module and the generation module is implemented by execution of software using the processor, and the software is stored in the storage unit.

7. The layout design system of claim 4, wherein the storage unit stores a plurality of candidate filler designs including active areas and extended active area having different shapes, and the generation module is further configured to modify the filler design by selecting one of the plurality of candidate filler designs stored in the storage unit.

8. A layout design system that receives a chip design requirement and provides a corresponding chip design to a circuit that stores the chip design, the layout design system comprising:

a processor;

a storage unit that stores a first standard cell design defining a first active area having a first width, a second standard cell design defining a second active area having a second width different from the first width, and a filler design having no active area;

a displacement module operating in conjunction with the processor and configured to;

arrange the first standard cell design in a first area and the second standard cell in a second area to generate an intermediate design in accordance with the chip design requirement, wherein the first area and the second area are separated in the intermediate design by the filler design, generate a first marker corresponding to the first width at a first boundary between the filler design and the first area, and a second marker corresponding to the second width at a second boundary between the filler design and the second area, such that the first marker and the second marker are defined in the intermediate design, and store the intermediate design in the storage unit.

9. The layout design system of claim 8, wherein the displacement module is further configured to measure a pitch separating the first standard cell design and the second standard cell design across the filler design, and to define a first length for the first marker and a second length for the second marker in accordance with the pitch.

10. The layout design system of claim 9, wherein the displacement module defines each one of the first length and the second length as being ½ of the pitch.

11. The layout design system of claim 8, further comprising:

a generation module operating in conjunction with the processor and configured to;

receive the intermediate design from the displacement module, modify the intermediate design by generating a first extended active area having the first width and extending the first length from the first boundary into a filler area defined by the filler design and by generating a second extended active area having the second width and extending the second length from the second boundary into the filler area to meet the first extended active area, generate the chip design in accordance with the modified intermediate design, and provide the chip design to the circuit storing the chip design.

12. The layout design system of claim 11, wherein the displacement module is further configured to generate the intermediate design with a normal gate area disposed in one of the first area and the second area, and the generation module is further configured to generate the chip design with a dummy gate area disposed in the filler area and arranged in parallel with the normal gate area.

13. The layout design system of claim 11, wherein the displacement module and the generation module are commonly provided by a single integrated module accessed by the processor.

14. The layout design system of claim 11, wherein the storage unit stores a plurality of candidate filler designs including active areas and extended active area having different shapes, and the generation module is further configured to modify the filler design by selecting one of the plurality of candidate filler designs stored in the storage unit.

15. A layout design system that receives a chip design requirement and provides a corresponding chip design to a circuit that stores the chip design, the layout design system comprising:

a processor;

a storage unit that stores a first standard cell design defining a first active area having a first width, a second standard cell design defining a second active area having a second width different from the first width, and a filler design having no active area;

a displacement module operating in conjunction with the processor and configured to;

arrange the first standard cell design in a first area and the second standard cell in a second area to generate an intermediate design in accordance with the chip design requirement, wherein the first area and the second area are separated in the intermediate design by the filler design, generate a first marker corresponding to the first width at a first boundary between the filler design and the first area, and a second marker corresponding to the second width at a second boundary between the filler design and the second area, such that the first marker and the second marker are defined in the intermediate design.

16. The layout design system of claim 15, wherein the displacement module is further configured to measure a pitch separating the first standard cell design and the second standard cell design across the filler design, and to define a first length for the first marker and a second length for the second marker in accordance with the pitch.

17. The layout design system of claim 16, further comprising:

a generation module operating in conjunction with the processor and configured to;

receive the intermediate design from the displacement module, modify the intermediate design by generating a first extended active area having the first width and extending the first length from the first boundary into a filler area defined by the filler design and by generating a second extended active area having the second width and extending the second length from the second boundary into the filler area to meet the first extended active area, generate the chip design in accordance with the modified intermediate design, and provide the chip design to the circuit storing the chip design.

18. The layout design system of claim 17, wherein the displacement module is further configured to generate the intermediate design with a normal gate area disposed in one of the first area and the second area, and the generation module is further configured to generate the chip design with a dummy gate area disposed in the filler area and arranged in parallel with the normal gate area.

19. The layout design system of claim 17, wherein the displacement module and the generation module are commonly provided by a single integrated module accessed by the processor.

* * * * *